United States Patent [19]  [11] 4,202,614
Harvey  [45] May 13, 1980

[54] PHOTOGRAPHIC CAMERAS
[75] Inventor: Donald M. Harvey, Webster, N.Y.
[73] Assignee: Eastman Kodak Company, Rochester, N.Y.
[21] Appl. No.: 931,076
[22] Filed: Aug. 4, 1978

Related U.S. Application Data
[63] Continuation of Ser. No. 774,715, Mar. 7, 1977, abandoned.
[51] Int. Cl.² ............................................. G03B 1/00
[52] U.S. Cl. .................................. 354/121; 352/102; 354/203
[58] Field of Search ............... 354/121, 203, 275, 150, 354/120, 175; 352/102, 103; 96/67, 201
[56] References Cited
U.S. PATENT DOCUMENTS

| 1,410,029 | 3/1922 | Niell | 352/102 |
| 1,563,551 | 12/1925 | Bulask | 352/103 |
| 1,946,836 | 2/1934 | Chase | 352/103 |
| 2,188,974 | 2/1940 | Dilks | 354/121 |
| 2,625,087 | 1/1953 | Steineck | 354/121 |
| 3,581,641 | 6/1971 | Nerwin | 354/275 X |
| 3,815,147 | 6/1974 | Wick et al. | 354/203 |

Primary Examiner—John Gonzales
Attorney, Agent, or Firm—R. W. Hampton; A. B. Pagel

[57] ABSTRACT

The disclosure relates to photographic cameras adapted to receive film cartridge assemblies enclosing rotatable film disk units. When a film cartridge assembly is received in the camera, it cooperates with a camera mechanism that opens an exposure window in the cartridge assembly and rotates the film disk unit incrementally to locate successive exposure areas accurately in exposure position. Various novel camera mechanisms are also disclosed for supporting the film exposure area in a predetermined film exposure plane and for preventing accidental exposure of the film to ambient light.

18 Claims, 31 Drawing Figures

PHOTOGRAPHIC CAMERAS

This is a continuation, of application Ser. No. 774,715, filed Mar. 7, 1977, abandoned.

CROSS REFERENCE TO RELATED APPLICATIONS

Reference is hereby made to commonly-assigned copending U.S. Patent Application Ser. No. 774,716 entitled PHOTOGRAPHIC FILM UNIT AND CARTRIDGE ASSEMBLY, filed in the name of Donald M. Harvey on even date herewith.

DESCRIPTION OF THE PRIOR ART

Most cameras capable of producing a plurality of exposures on a single piece of film use an elongate strip of roll film that is incrementally advanced lengthwise through an exposure gate to expose successive longitudinally spaced exposure areas. Alternatively, it has been known for many years to produce multiple exposures on a disk of film that is incrementally rotated in a camera to expose successive circumferentially spaced exposure areas on the film disk. Such a film disk has several advantages over roll film, two particularly significant considerations being the relative ease with which the film can be supported in flat condition in the exposure gate and the relative simplicity of the camera mechanism required to index the film disk for successive exposures.

A typical example of an early film disk camera is disclosed in U.S. Pat. Nos. 509,841 and 517,539, issued respectively on Nov. 28, 1893 and Apr. 3, 1894. The camera disclosed by these patents resembles a pocket watch and was sold for many years under the trademark "Photoret". In this camera, a disk of film is clamped about its periphery to the flat internal face of a cup shaped member that forms the rear casing of the camera. The lens and shutter assembly is attached to the front cover lid of the camera, whereby incremental rotation of the back casing relative to the front cover lid causes successive segments of the film to move into alignment with the lens. The shutter mechanism limits the rotational movement of the back casing after each successive exposure to provide uniform spacing of the exposure images. Each successive incremental rotation of the cover also serves to cock the shutter, thereby preventing the same film area from being exposed twice in immediate succession. No means were provided, however, for preventing the film disk from being rotated through more than one complete revolution, which could result in double exposures.

U.S. Pat. No. 1,773,106, issued Aug. 19, 1930, discloses another camera adapted to use a film disk, which in this case is clamped to an incrementally rotatable spindle that extends through a central hole in the disk. A flat pressure plate bears against a portion of the film that is being exposed to hold it against a flat support plate provided with an exposure aperture. The incremental rotation of the film disk is achieved by means of a ratchet wheel on the rotatable film disk spindle. The spindle indexing means cooperates with the shutter cocking mchanism to prevent a second operation of the shutter before the disk has been indexed and an interlock device is controlled by the film compartment door to prevent the shutter from being operated after the disk has made a complete revolution until the door has been opened to change disks.

A significant disadvantage of the types of cameras described above is that the film disk must be loaded into the camera in total darkness, whereas the use of backing paper or light tight film containers has for many years allowed roll film cameras to be loaded in daylight. To overcome this problem, it has also been known in the past to enclose a film disk in a light tight film container provided with an exposure window that is closed by a socalled cover slide whenever the cartridge is removed from the camera. Various terms including cartridge, magazine, pack and cassette have been applied to such film containers, which, when loaded with film, are herein referred to as film cartridge assemblies.

Examples of prior art film cartridge assemblies and associated camera structures are shown in U.S. Pat. Nos. 2,446,200 issued on Aug. 3, 1948 and 2,531,651, 2,531,652 and 2,531,653, all issued on Nov. 28, 1950. A camera incorporating various features disclosed in these patents was sold under the trademark "Foto Disc". In general this type of film cartridge assembly resembles the previously mentioneed "Photoret" camera in that the film disk is rotatable by means of an externally accessible ring surrounding the cartridge assembly while the front wall of the cartridge assembly supports the camera's lens and shutter. A cover slide incorporated in the cartridge assembly is operated by the attachment of the lens and shutter structure to the cartridge assembly and detent means are provided within the cartridge assembly for establishing uniform film indexing positions and for preventing more than one revolution of the film disk. These patent references disclose both single film disk cartridge assemblies and cartridge assemblies that employ two film disks in back to back relation to each other, the latter being provided on both faces with cover slide means and with means for attachment of the lens and shutter assembly, thereby doubling the number of available exposures. Because of the relatively complicated sheet metal construction employed in these various cartridge assembly embodiments, they were intended to be opened and reloaded by the film processor.

Another camera using disk film cartridge assemblies was produced in Japan under the trademark "Petal", beginning about 1949. This was a sub-miniature camera that uses a metal cartridge assembly about the size of a quarter. The cup shaped rear casing of the cartridge assembly, to which the film disk is peripherally clamped, is received within and keyed to a rotatable externally accessible portion of the camera housing and the front wall of the cartridge assembly includes an aperture covered by a pivotal spring loaded cover slide. The initial rotation of the camera housing opens the cover slide and subsequent incremental rotations of the housing, indexed by a detent device, bring successive exposure areas into alignment with the camera's lens. No means are provided for preventing double exposures and the cartridge assembly was apparently intended to be returned to the film processor for reloading.

Still another sub-miniature camera of this same general type was sold under the trademark "Steineck" and is disclosed in U.S. Pat. No. 2,625,087 issued on Jan. 13, 1953. This camera is in the shape of a wrist watch and uses a film cartridge assembly intended to be reloaded by the film processor. The cartridge assembly includes two superimposed closure plates, each of which is provided with an exposure window and with an arcuate transport tooth window. One of the closure plates is stationary with respect to the cartridge assembly housing and the other one is rotatably moveable. Whenever the cartridge assembly is removed from the camera, the windows in these two plates are out of alignment with each other to prevent accidental exposure of the film. Installation of the cartridge assembly into the camera causes the movable plate to rotate so that the two exposure windows are aligned with the camera's objective lens and shutter, and so that a transport tooth carried by the camera can enter into the interior of the cartridge assembly through the aligned transport tooth windows. A rotatably supported hollow bushing within the cartridge assembly carries a transport disk that is located immediately behind the closure plates and provided with spaced exposure apertures and with corresponding peripheral transport notches. Stacked on the bushing behind the transport disk are the film disk, a film positioning disk, a tension disk and a counter disk, each of which is provided with an edge notch engaged with a pin on the transport disk to keep all of these disks in fixed rotational relation to each other. Each operation of the shutter operating lever causes the shutter to open momentarialy and then actuates the movement of the transport finger, which engages the next transport notch in the transport disk and rotates the latter to thereby angularly move all of the disks in unison so that the next exposure area is brought into exposure position. The counter disk is provided with a circular row of numbers corresponding to the film exposures and a window in the back of the cartridge assembly allows the photographer to see the counter disk number indicative of the number of exposures remaining to be made. Removal of the cartridge assembly from the camera automatically closes the exposure and transport finger windows and, if not all of the available exposures have been used, the cartridge assembly can later be reinstalled to expose the remaining exposure areas. The same transport disk pin that prevents relative rotation between the various disks also cooperates with a stationary plate behind the counter disk to limit the rotation of the rotatable disks to 360 degrees, thereby preventing reexposure of the film in a previously exposed cartridge assembly.

SUMMARY OF THE INVENTION

The present invention relates to cameras adapted to use non-reloadable disk type film cartridge assemblies of the type described in my co-pending U.S. patent application Ser. No. 774,716, entitled Photographic Film Unit and Cartridge Assembly filed on Mar. 7, 1977 and assigned to the same assignee as the present invention. Briefly, such a cartridge assembly comprises a casing that remains stationary within a camera. A film disk enclosed within the casing is permanently attached to a central hub that extends through the front wall member of the casing so that it is accessible from the exterior of the casing. A cover slide attached to the hub within the casing covers an exposure window and is rotatable with the film disk so that the window is open except when the hub is rotated to its initial position. A lock member incorporated in the hub assumes a first condition that initially locks the hub with the exposure window closed by the cover slide and that is released when the cartridge assembly is loaded into the camera. After the hub has been rotated and again returns to this position, it is again locked by the lock member, but in a different way so that it cannot again be released if that same cartridge assembly is subsequently reloaded into a camera. Accordingly, one object of the present invention is to provide a camera with a simple and reliable mechanism for operating such a locking device; another related object of the invention being to ensure that the camera cannot be opened to permit removal of the cartridge assembly unless the hub has first been returned to its initial position to close the exposure window.

To facilitate the exposure of the film disk in a camera and various automatic printing or projection operations performed after the film disk is developed, an external portion of the cartridge assembly hub includes index surfaces that are in predetermined accurate relation to the location of the image areas exposed by the camera. Another object of the invention is to provide a camera adapted to use such a film disk cartridge assemblies with simple but nevertheless highly accurate means for supporting the film disk hub and for indexing it accurately with reference to those index surfaces, both in manual and automatic advance versions of such a camera.

Another object of the invention is to facilitate smooth rotation of the film disk and to minimize the possibility of abrading its image areas, while at the same time insuring that the emulsion surface of the film area to be exposed is supported very accurately in a predetermined exposure plane. These objectives are accomplished in accordance with the invention through cooperation between the cartridge assembly and various novel pressure pad and film gate features contemplated by the invention.

Another object of the invention is to provide a very compact and aesthetically pleasing horizontal format camera configuration that exploits the shape of the film disk cartridge assembly by locating the axis of the objective lens parallel to the cartridge assembly in intersecting relation to a mirror or prism by which the film disk is exposed through the exposure window. In addition to its compactness and aesthetic appeal, this camera configuration lends itself admirably to the use of simple and straightforward mechanism constructions and also provides a high degree of versatility in facilitating the use of interchangeable components throughout a series of camera models having various degrees of sophistication such as single lens reflex viewfinders, fully automatic film advancing and shutter cocking features, etc.

Various means for practicing the invention and other advantages and novel features thereof will be apparent from the following detailed description of illustrative preferred embodiments of the invention, reference being made to the accompanying drawings in which like reference numerals denote like elements. In the Drawings.

Figure 11:
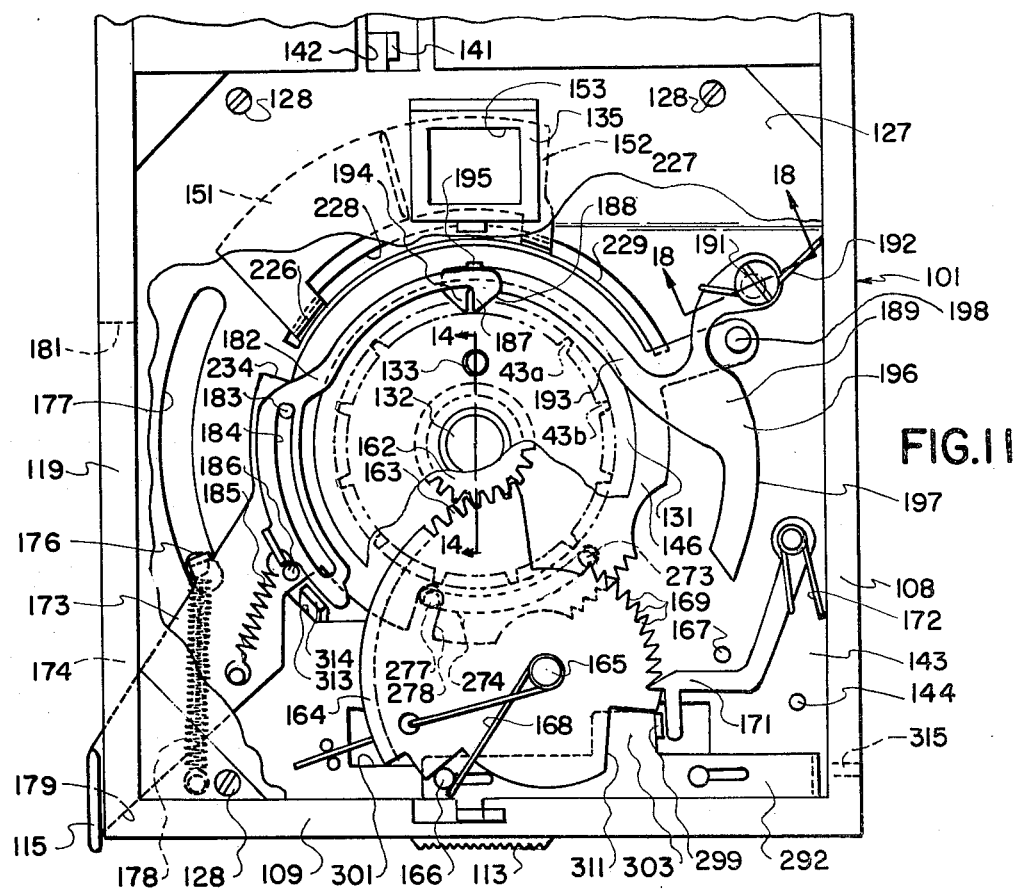
FIG. 11 is a plan view of the mechanism incorporated in the camera shown in FIG. 10, depicting the respective positions of the illustrated mechanism components when a film cartridge assembly has been loaded into the camera but before the film disk hub has been moved from its initial position.
Figure 12:
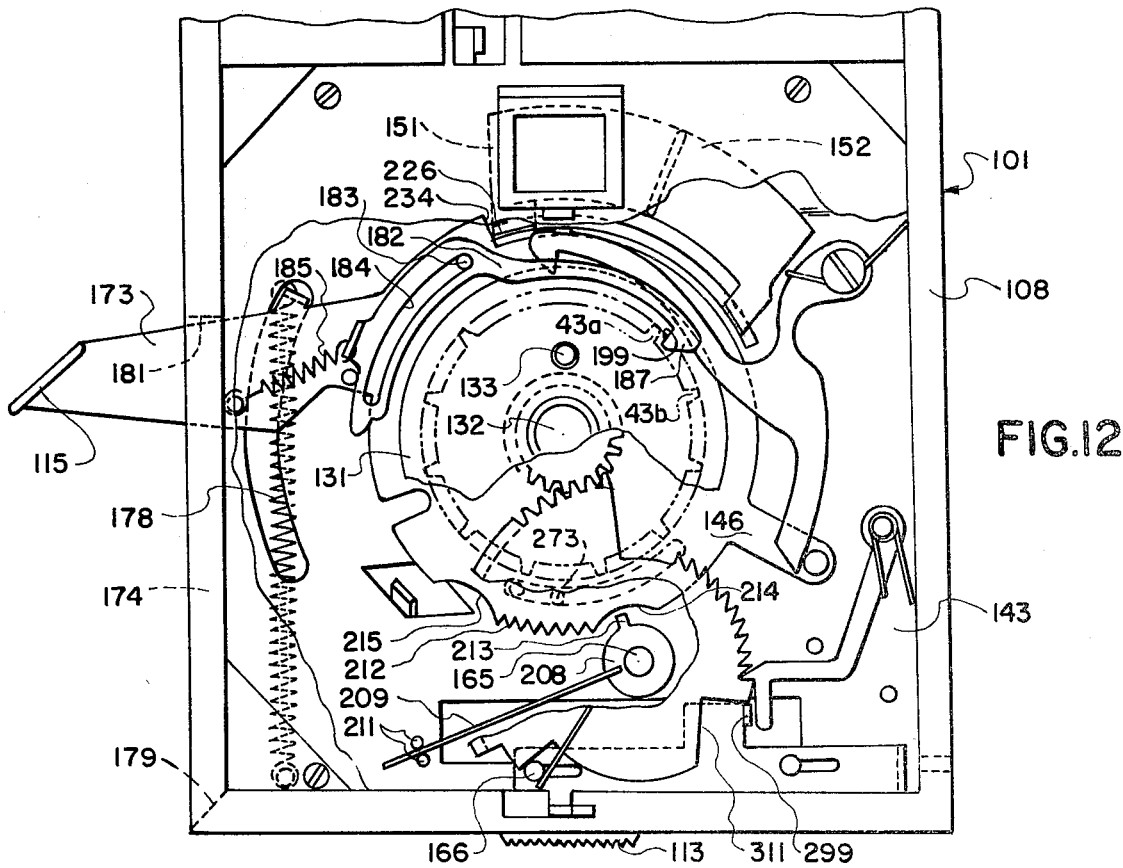
Figure 13:
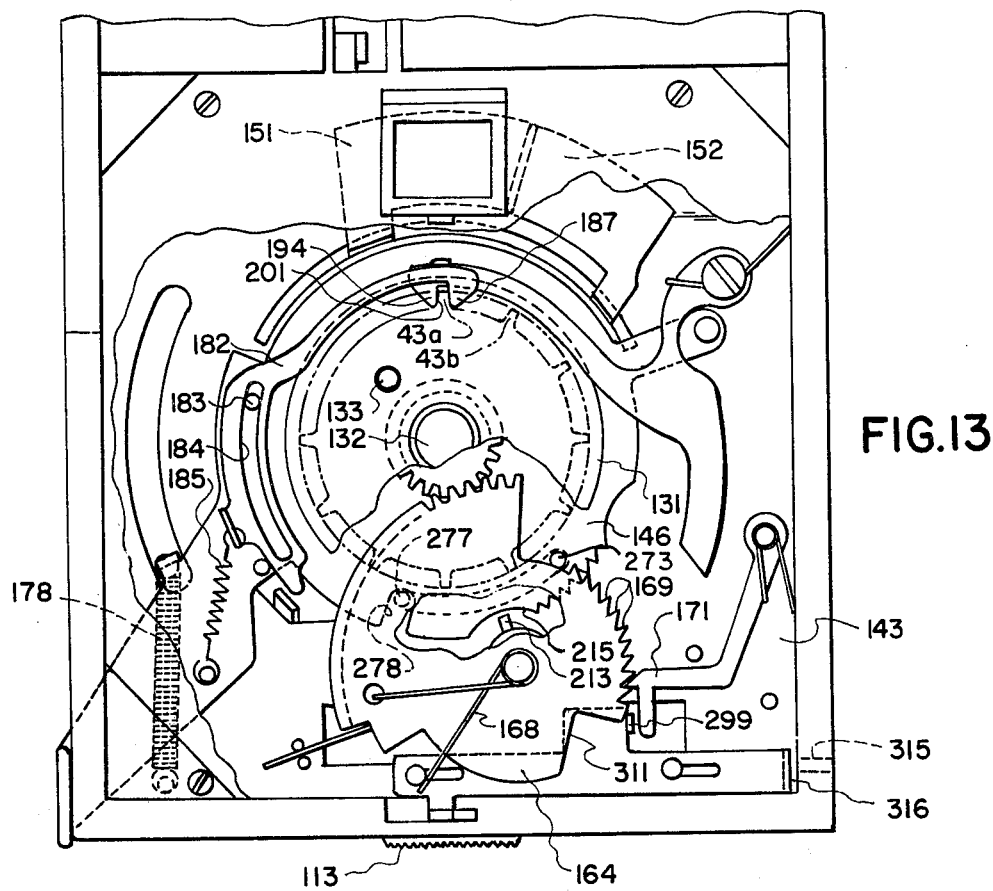
Figure 14:
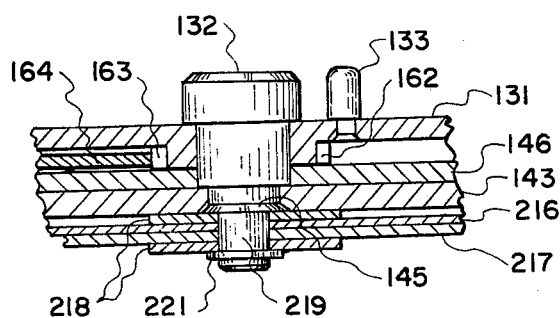
Figure 15:
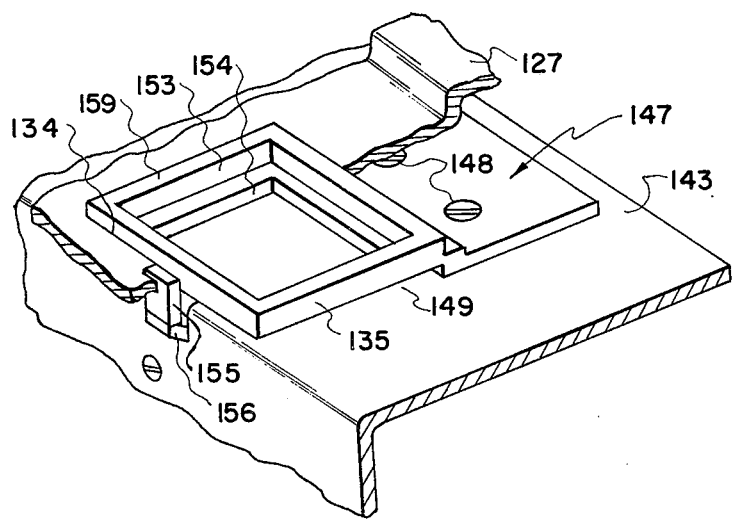
Figure 19:
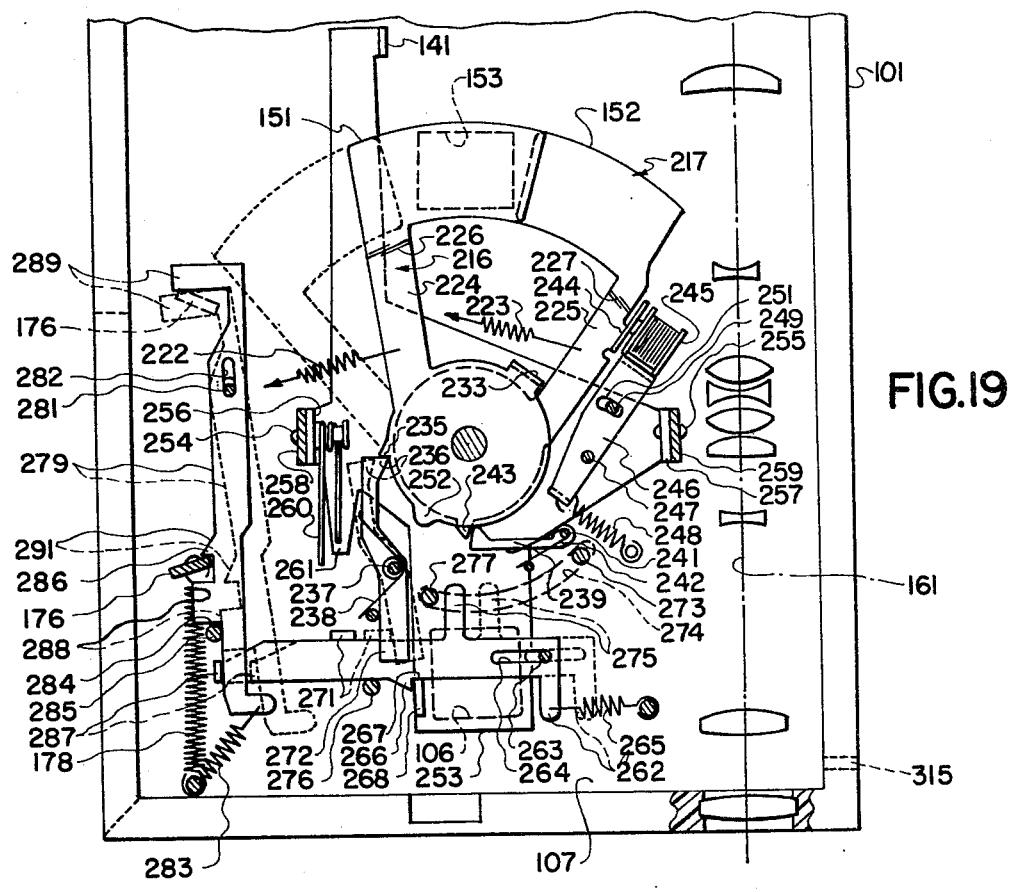
Figure 16:
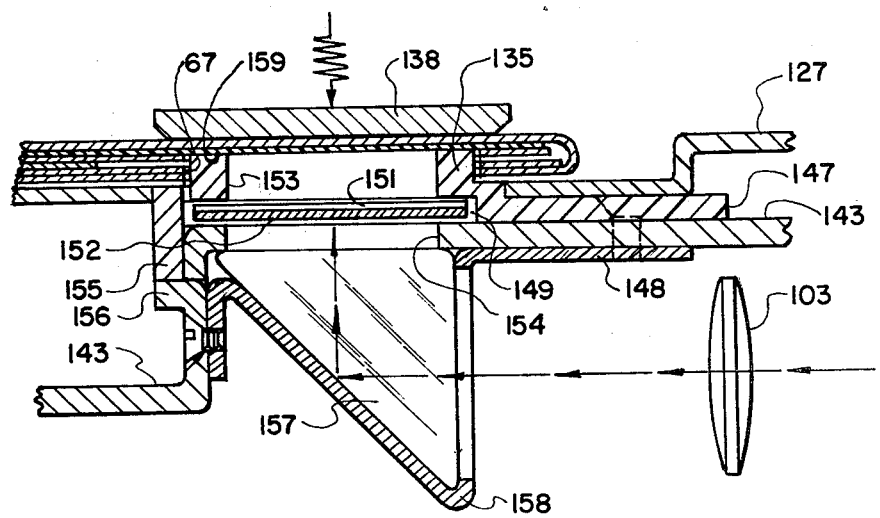
Figure 17:
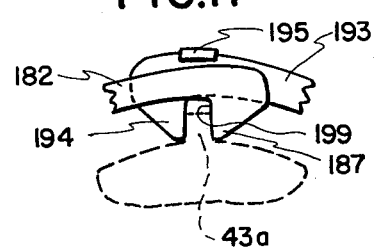
Figure 18:
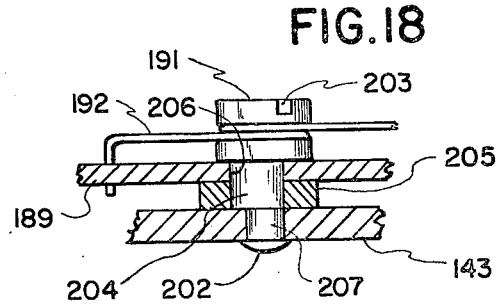
Figure 20:
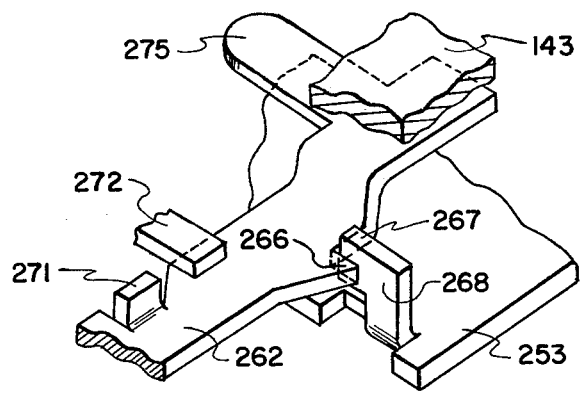
Figure 21:
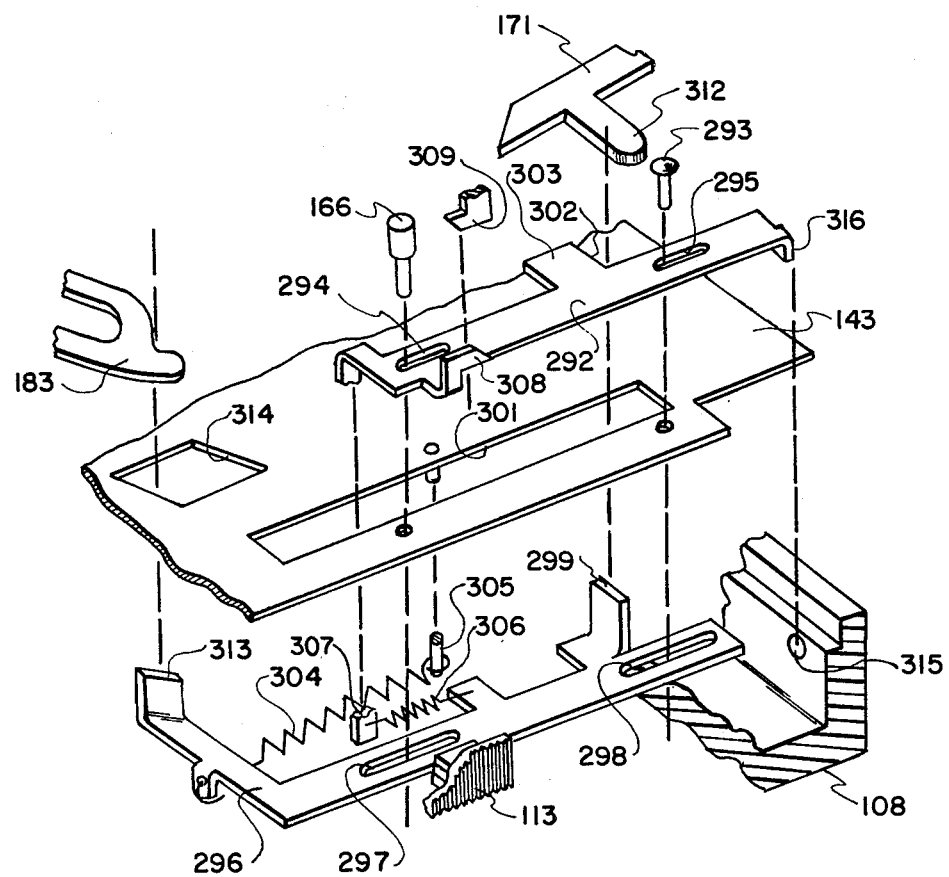
Figure 22:
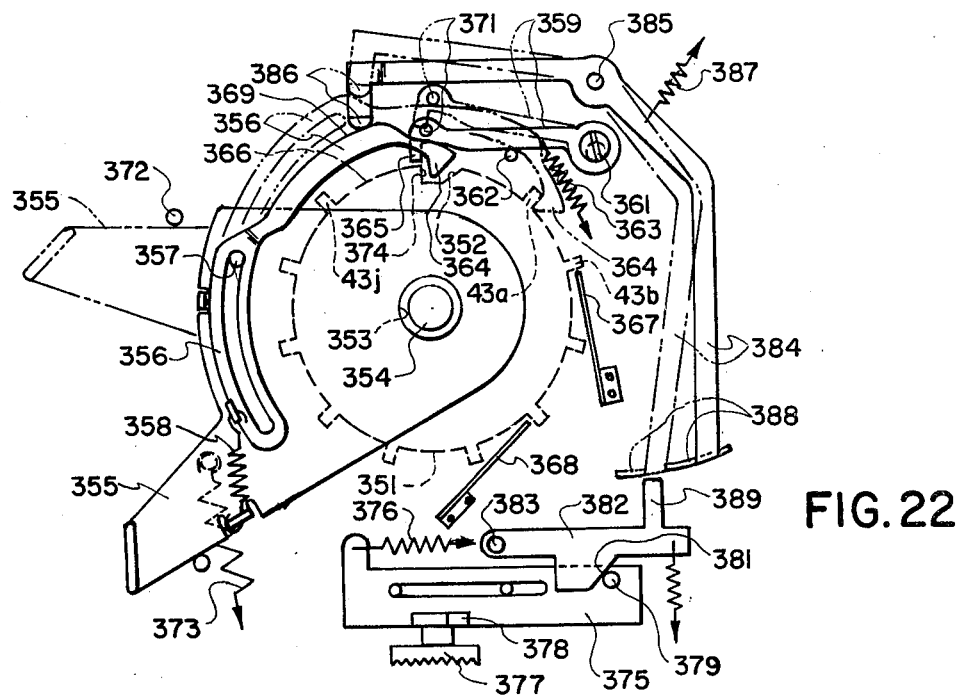
Figure 23:
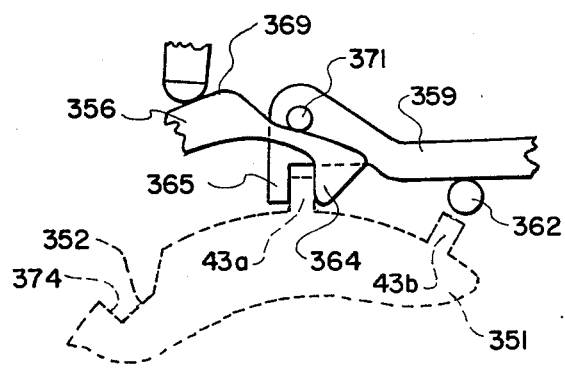
Figure 24:
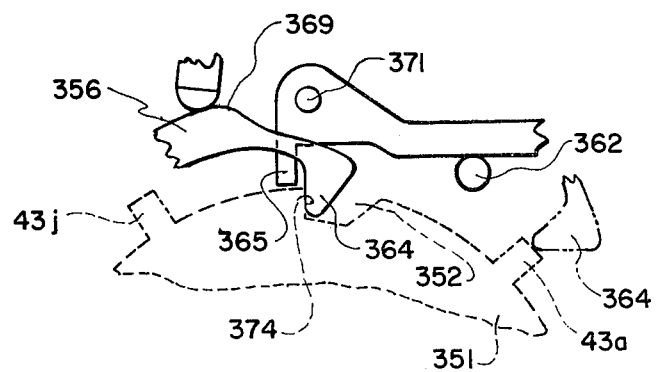

FIG. 12 corresponds to FIG. 11 but depicts the illustrated mechanism in the process of engaging the film disk hub to effect the initial rotational movement thereof;

FIG. 13 corresponds to FIGS. 11 and 12 and illustrates the respective positions of the mechanism components after completion of the first indexing operation which removes the cover slide from the exposure window and locates the first exposure area in position for exposure;

FIG. 14 is a fragmentary enlarged cross sectional view taken along line 14—14 of FIG. 11;

FIG. 15 is a fragmentary perspective view of the film support frame member incorporated in the illustrate camera;

FIG. 16 is a somewhat schematic cross sectional view of the gate structure and the optical elements associated therewith;

FIG. 17 is an enlarged view of a portion of FIG. 13 illustrating the advancing pawl tooth and the indexing pawl tooth;

FIG. 18 is an enlarged partially cross sectional view taken along line 18—18 of FIG. 11;

FIG. 19 is a plan view corresponding to FIGS. 11-13 but depicting the components of the camera located below the mechanism plate illustrated in those figures;

FIG. 20 is an enlarged fragmentary perspective view of a portion of the shutter release mechanism illustrated in FIG. 19;

FIG. 21 is an enlarged exploded view of the cover latching mechanism of the camera illustrated in FIGS. 9-20;

FIG. 22 is a somewhat schematic plan view of another embodiment of the invention in the form of a very simple manual film advancing mechanism;

FIG. 23 is an enlarged fragmentary view of the advancing and positioning teeth employed in the mechanism shown in FIG. 22, and illustrates the respective positions of those teeth when the film disk is positioned for exposure;

FIG. 24 corresponds to FIG. 23 and shows the respective positions of the advancing and positioning teeth after the film disk hub has completed its rotation to return the cover slide to the cartridge assembly's exposure window.

Figure 25:
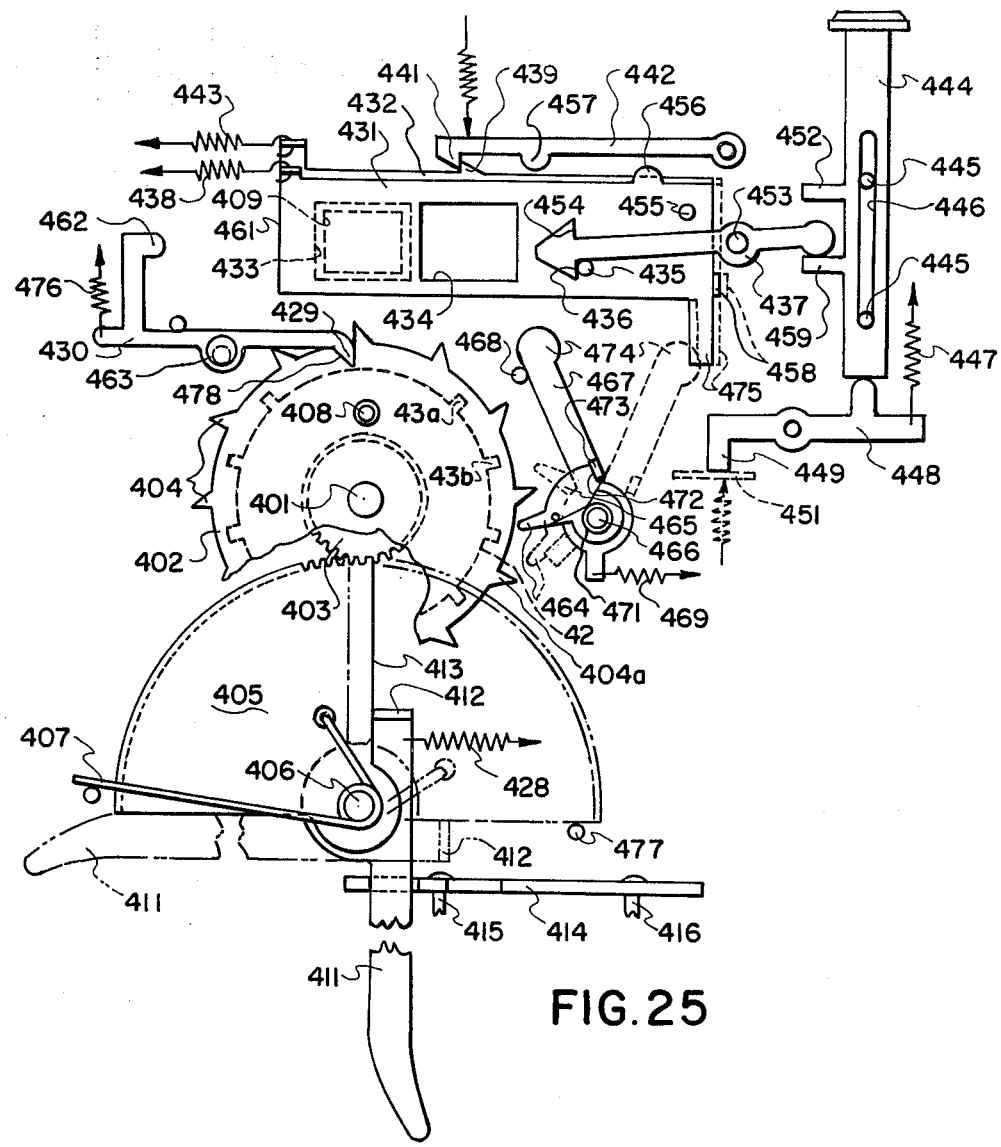
Figure 26:
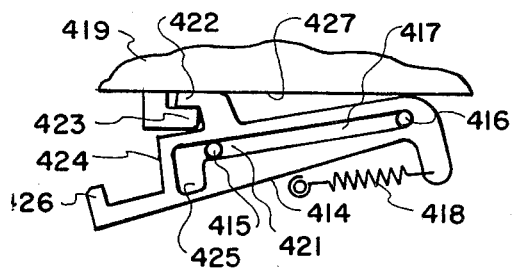
Figure 27:
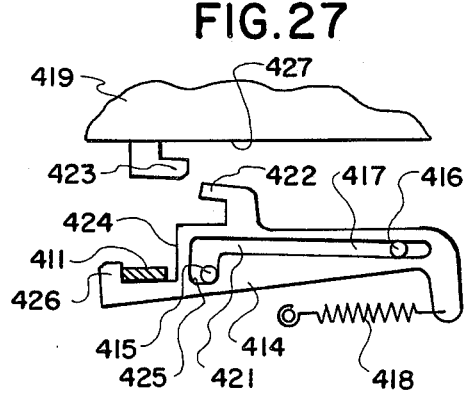
Figure 28:
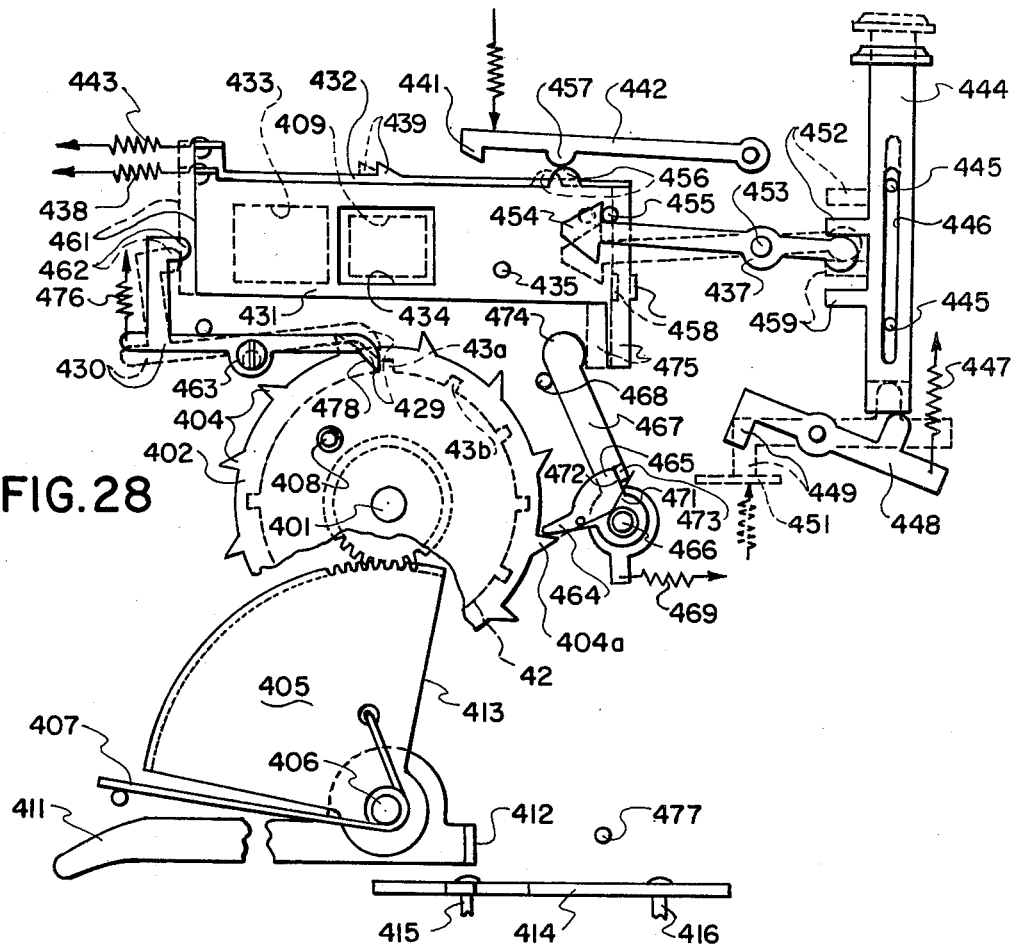
Figure 29:
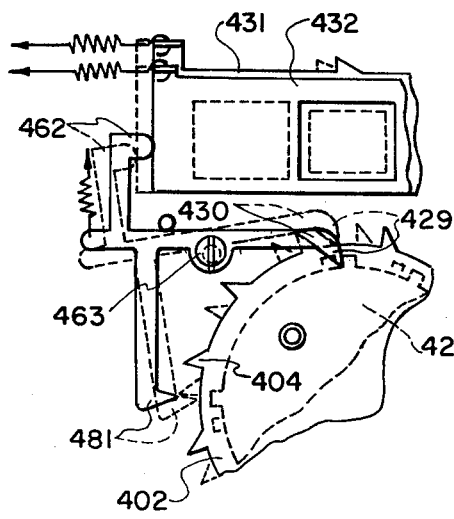
Figure 30:
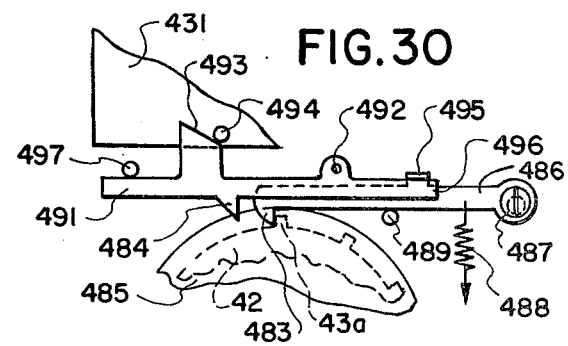
Figure 31:
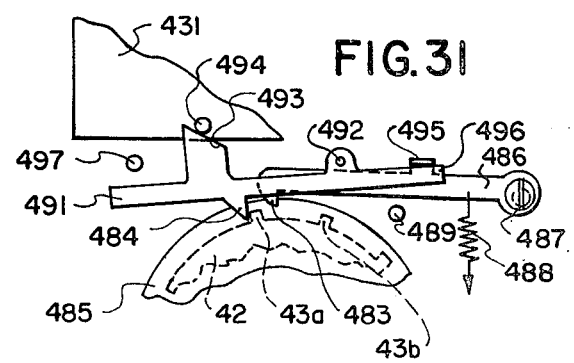

FIG. 25 is a somewhat schematic plan view of another embodiment of the invention comprising an automatic film advancing mechanism, showing the depicted components of that mechanism in their respective positions during the camera loading operation;

FIG. 26 illustrates the door latch device incorporated in the mechanism depicted in FIG. 25, showing that device in its latching condition;

FIG. 27 corresponds to FIG. 25 and shows the door latch device in its released condition;

FIG. 28 corresponds to FIG. 25 and shows the respective positions assumed by the various illustrated components as the film disk is advanced and exposed;

FIG. 29 illustrates a modification of the film unit advancing and indexing mechanism shown in FIGS. 25 and 28;

FIG. 30 depicts another modification of the mechanism shown in FIGS. 25 and 28, with the illustrated components shown in the positions that they assume after completion of a film indexing operation; and FIG. 31 corresponds to FIG. 30 but shows the depicted components in their respective positions during a film advancing operation.

DETAILED DESCRIPTION OF THE INVENTION

Because photographic cameras adapted to be loaded with cartridge assemblies are well known, the present description will be directed in particular to camera and cartridge assembly elements forming part of or cooperating directly with camera elements to which the present invention is specifically directed. It is to be understood that camera and cartridge assembly elements not specifically shown or described may take various forms well known to those skilled in the art.

The representative disk film cartridge assembly 41 shown in FIGS. 1 through 8 is the subject of my commonly assigned U.S. Patent Application Ser. No. 774,716 entitled Photographic Film Unit and Cartridge Assembly, filed on Mar. 7, 1977, which describes various features of such a cartridge assembly in greater detail than is necessary to an understanding of the present invention.

Figure 1:
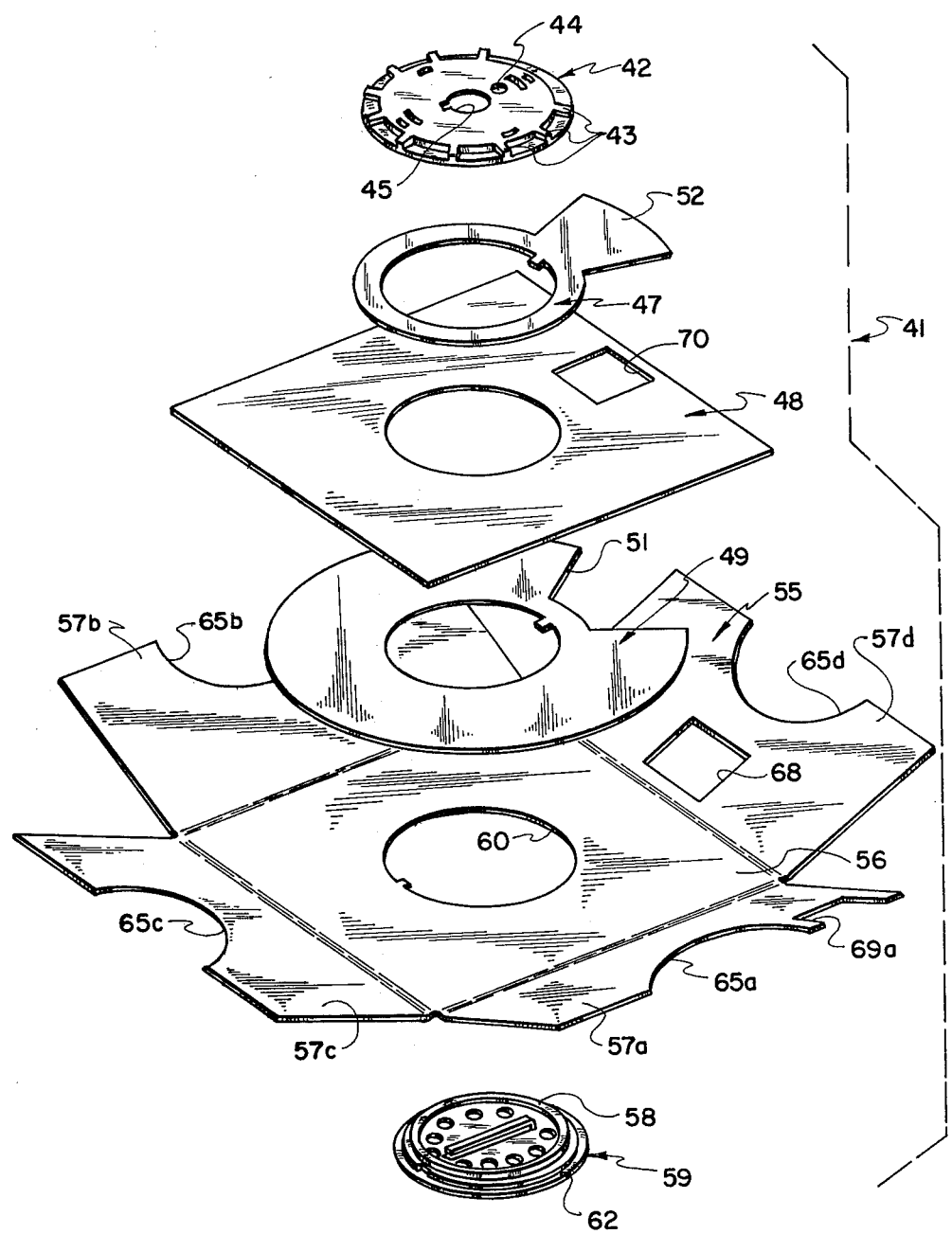
FIG. 1 is an exploded perspective view of a disk type film cartridge assembly of the type use in the cameras to which the present invention is directed.
Figure 5:
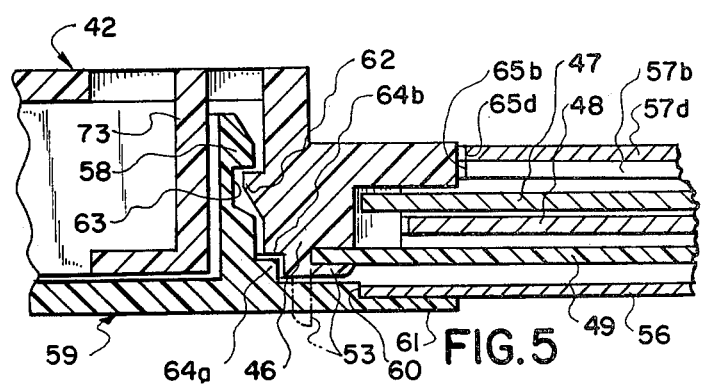
FIG. 5 is a fragmentary enlarged view corresponding to a portion of FIG. 4.
Figure 4:
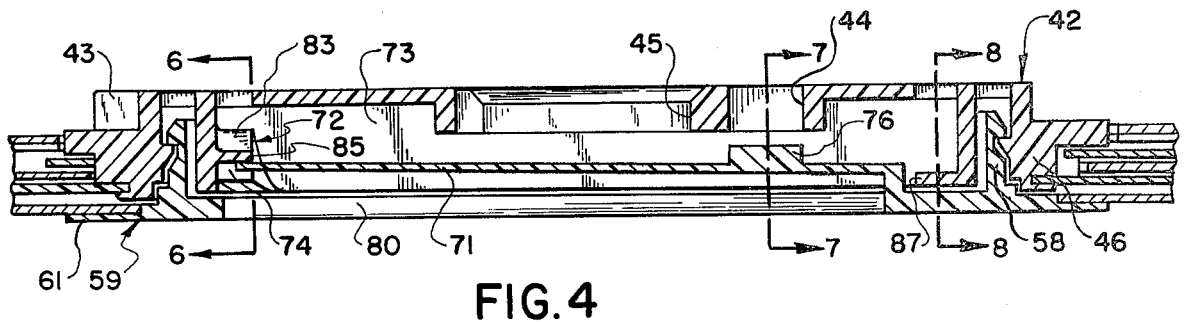
FIG. 4 is a fragmentary enlarged cross sectional view of the film cartridge assembly taken along line 4—4 of FIG. 2.

As is best shown in FIG. 1, the illustrative film cartridge assembly 41 comprises a molded plastic hub 42 provided with a plurality of radial index ears 43 corresponding to the number of exposures provided by the cartridge assembly. For illustrative purposes, hub 42 is shown as having ten such ears spaced 30° apart and thereby leaving a 90° open area aligned with coupling hole 44 adjacent the hub's central spindle hole 45. As shown in FIGS. 4 and 5, the reverse face of the hub includes a stepped ring structure 46 that projects through a rotatable cover slide 47, a baffle sheet 48 and a film disk 49. The cover slide and the baffle sheet are made of thin opaque sheet material, preferably paper or plastic, and the film disk comprises a relatively stiff piece of flat photographic film with its emulsion side facing the index ears of hub 42. The cover slide and the film disk are keyed to hub 42 to maintain the segmental slot 51 in the film disk in alignment with peripheral cover slide segment 52 and with the portion of the hub defined by the 90° ear spacing. The hub, the cover slide and the film disk are thus rotatable in unison relative to the baffle sheet, which is sandwiched between the cover slide and the film disk. As shown at numeral 53 in FIG. 5, a peripheral rim of the plastic hub material is swaged into gripping engagement with the central hole of the film disk by a thermal or ultrasonic process to permanently clamp the disk to the hub. Preferably, the film disk includes a plurality of exposure areas as shown at number 54 in FIG. 2, which are bordered by previously exposed and therefore no longer sensitive areas of the film emulsion. Each of these exposure areas bears the same predetermined relation to its corresponding index ear as each of the other exposure areas bears to its corresponding index ear and this same relationship is maintained in all corresponding film cartridge assemblies.

The casing member 55 of the film cartridge assembly, best shown in FIG. 1, comprises a piece of flexible opaque sheet material formed with a square center section 56 slightly larger than the membrane card 48 and with four lateral flaps 57a through 57d. An upstanding cylindrical rib 58 of molded plastic hub support plate 59 projects through and is keyed to opening 60 in the square center section of the shell member and a peripheral flange 61 of that plate is permanently sealed to the shell member by an appropriate adhesive material.

Figure 2:
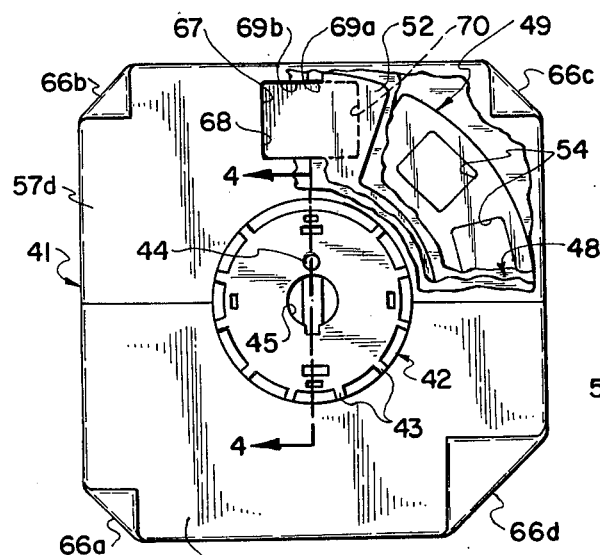
FIG. 2 is a plan view of the observe or exposure face of the film cartridge assembly shown in FIG. 1.
Figure 3:
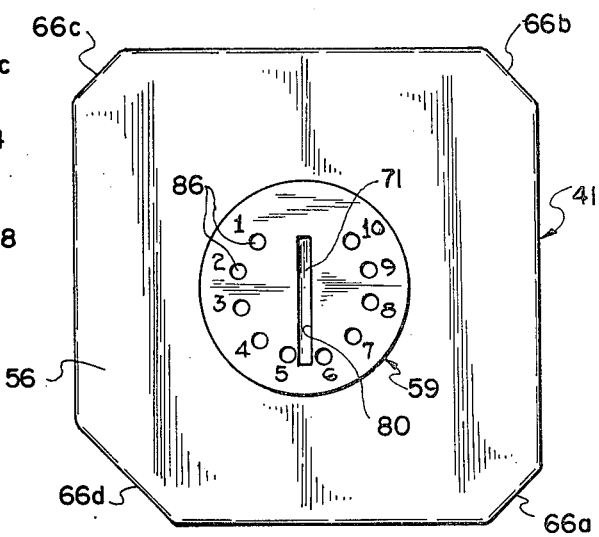
FIG. 3 is a plan view of the reverse face of the film cartridge assembly.

A plurality of teeth, one of which is shown at numeral 62 in FIG. 5, extend inwardly from ring structure 46 of hub 42 and are adapted to snap into a circumferential groove 63 about the upstanding cylindrical rib 58 of the hub support plate to retain the hub and the support plate together in rotational relation to one another. As is best shown in FIG. 5, a labyrinth light barrier is provided between the periphery of rib 58 and the confronting surfaces of ring structure 46 by the cooperation of a circumferential shoulder 64a on the former with a mating annular notch 64b in the latter. After the film unit assembly comprising the hub, the cover slide, the baffle sheet and the film disk has been snapped into engagement with the hub support plate attached to the casing member, the flaps 57a and 57b and then flaps 57c and 57d are folded over and adhesively secured together in envelope fashion. The semi-circular openings 65a through 65d in the correspondingly numbered casing member flaps closely surround the periphery of the hub, but these openings need not be in light tight engagement with the hub because of the light barrier provided by the cooperation between the cover slide, the baffle sheet and the stepped configuration of the hub ring structure. The corners of the casing member are folded over and glued to the flaps as shown in FIGS. 2 and 3 to provide the cartridge with diagonal corners 66a–66d, with one of the corner flaps 66d being longer than the other three to provide an asymmetrical configuration to the completed film cartridge assembly. The exposure window 67 in the casing member, which is defined by the cooperation of aperture 68 in flap 57d and edge cutouts 69a and 69b in the respective flaps 57a and 57b, is aligned with the window 70 in the baffle sheet, but light entering the exposure window 67 cannot reach the photosensitive film disk because the peripheral segment 52 of the cover slide 47 is located between and in overlapping relation to the casing window and the baffle sheet window. Thus, it will be apparent that the film is completely protected from accidental exposure to light as long as the hub remains in its initial position with the peripheral cover slide segment 52 aligned with exposure window 67.

Figure 6:
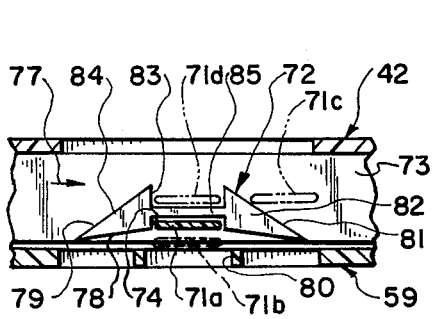
FIG. 6 is a fragmentary cross sectional view taken along line 6—6 of FIG. 4.
Figure 7:
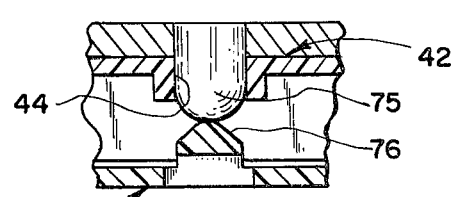
FIG. 7 is a fragmentary cross sectional view taken along line 7—7 of FIG. 4 but shows the film cartridge assembly in cooperation with a hub unlocking device incorporated in a camera.

To prevent accidental rotation of the cover slide out of alignment with the exposure window except when the cartridge assembly is installed in a camera, the cartridge assembly is provided with a hub locking device best illustrated in FIGS. 4, 6 and 7, which is described more fully in my previously identified copending patent application. As best shown in FIG. 4, this device comprises a cantilevered locking bar 71 molded integrally with and supported at one end to hub support plate 59. A dihedral locking boss 72, shown in FIGS. 4 and 6 is molded integrally with an internal cylindrical wall 73 of hub 42 and initially receives the unsupported end of the locking bar within primary locking notch 74, as shown at numeral 71a in FIG. 6; thereby preventing relative rotation between the hub and the hub support plate. When the film cartridge assembly is installed in a camera, a coupling pin 75, shown in FIG. 7, passes through coupling hole 44 in the hub and engages a roof shaped projection 76 on locking bar 71 to flex the latter slightly and thereby move its unsupported end out of locking notch 74 to the position shown at numeral 71b in FIG. 6. As described hereinafter, coupling pin 75 is carried by an element of the camera that is rotatable with the film disk hub. When the film disk hub is rotated relative to the hub support plate by the camera's film advancing mechanism, in the direction shown by arrow 77 in FIG. 6, the lower ramp face 78 of boss wing 79 cams the unsupported end of the locking lever partially into hub support plate slot 80 as the locking boss moves beyond engagement with the locking bar. Because the hub support plate remains stationary during this rotational movement of the hub, pin 75 moves out of engagement with the roof shaped projection 76 of the locking bar, whereupon the free end of the locking bar again assumes the same position that it occupied when it was trapped in locking boss notch 74 and no longer has any retarding influence on the rotation of the hub. When the hub has approached completion of a 360° rotation, the free end of the locking bar engages upper ramp surface 81 of the locking boss wing 82, as shown at 71c in FIG. 6 and is thereby cammed upwardly so that it enters upper locking notch 83 of the boss, as shown at 71d, to again lock the hub in fixed relation to the support plate. During this final rotational movement, projection 76 of bar 71 again engages pin 75, but the pin cannot perform its previous function of releasing the locking cooperation between bar 71 and boss 72. If the hub is rotated less than a completed revolution and then is rotated in the opposite direction back to its initial position, the free end of the locking bar engages upper ramp surface 84 of the locking boss wing 79 and is thereby cammed upwardly and into locking notch 83 in the same manner. Accordingly, it will be seen that the locking engagement between the hub and the hub support plate is released when the film cartridge assembly is initially installed in a camera but cannot again be released by a second installation of the cartridge assembly into a camera after the film disk has been rotated and then returned to its initial position. Alternatively, as described in my previously identified co-pending U.S. Patent Application, the locking bar can be released by the central support spindle that extends through hub hole 45.

The lower face of the locking bar 71 is visible through slot 80 in the hub support plate and, as just described, its free end is located below septum 85 of locking boss 72 prior to installation of the film cartridge in a camera and above that septum after the hub has been returned to its initial position. Accordingly, by either painting the tip of the locking bar with an easily visible color or by similarly painting the lower surface of septum 85, a used film cartridge assembly can be visually distinguished from an unused one by observing whether such a marking is visible through slot 80.

Figure 8:
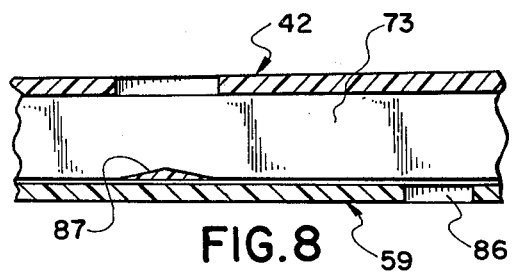
FIG. 8 is a fragmentary cross sectional view taken along lines 8—8 of FIG. 4.

As shown in FIGS. 2 and 4, the hub support plate 59 of the film cartridge assembly is provided with a plurality of holes 86 aligned with the corresponding indexing ears on the hub when the latter is in its initial position. A shoe 87, shown in FIGS. 4 and 8, is coated on its lower face with an easily visible material. When the hub is rotated to bring the first exposure area into exposure position, the shoe is visible through the hole identified by the numeral 1, and each successive indexing movement of the hub brings the shoe into alignment with the next successively numbered hole; thus providing a convenient means for identifying the particular exposure area that has been brought into position for exposure.

The illustrative preferred embodiment of the invention illustrated in FIGS. 9 through 21 is designated as a manual film advance camera, which refers to the fact that the energy required to accomplish each successive indexing movement of the film disk is derived from a corresponding manual movement of a film advancing member.

Figure 9:
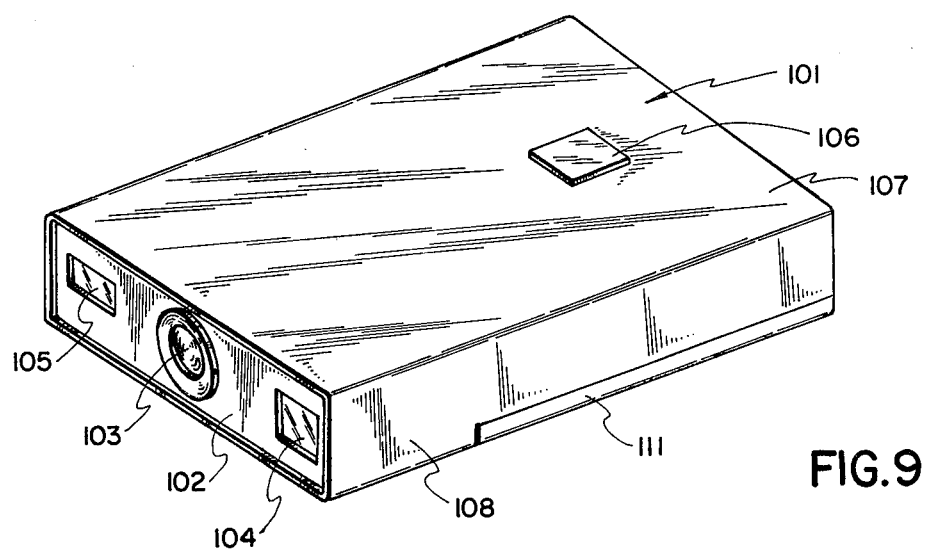
FIG. 9 is a perspective view of a camera according to a preferred embodiment of the present invention, adapted to be loaded with a film disk cartridge assembly of the type shown in the preceding figures.
Figure 10:
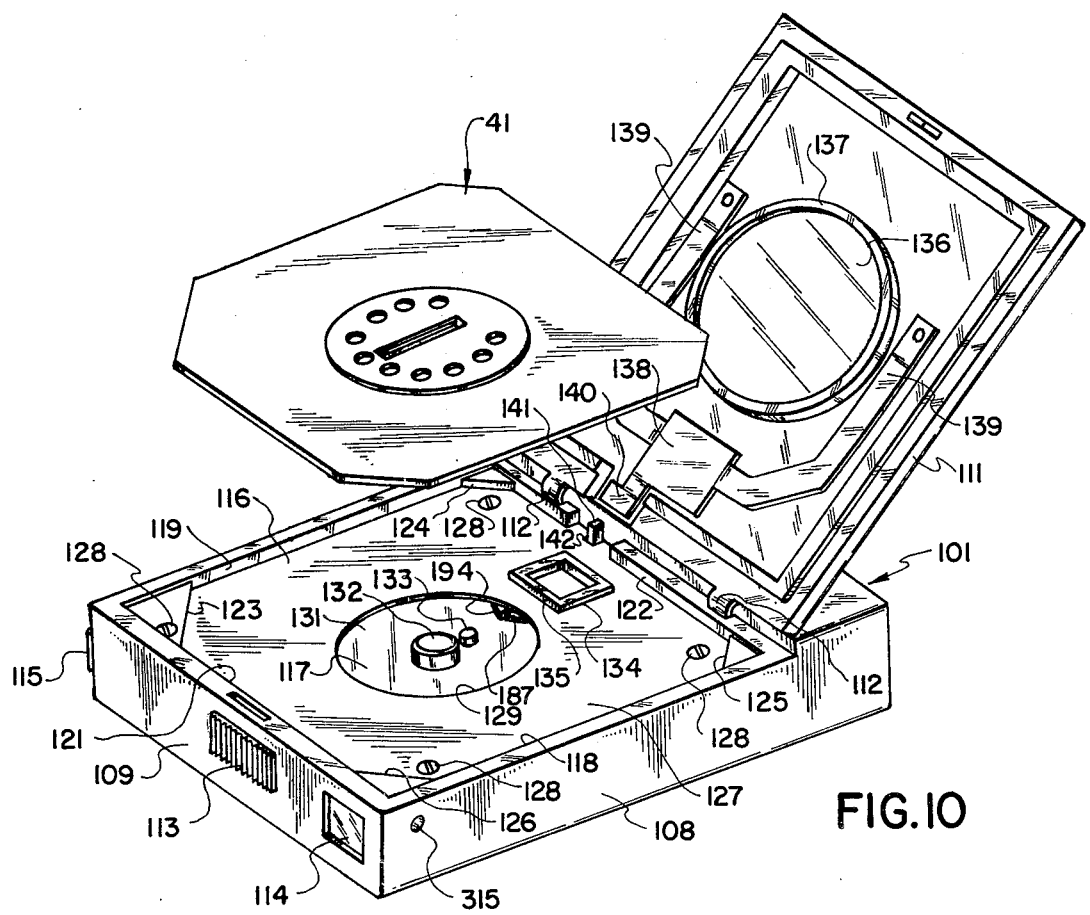
FIG. 10 is a perspective view of the camera shown in FIG. 8 illustrating that camera inverted and pointed in the opposite direction and with its cover door open to receive a film disk cartridge assembly.

FIG. 9 depicts this illustrative camera 101 in its operative position and shows the front wall 102 of the camera provided with an objective lens 103, a viewfinder lens 104 and a window 105 associated with a photosensitive element of an automatic exposure control device. A rectangular shutter operating button 106 is centrally located with respect to the top wall 107 of the camera housing 108 and is substantially flush with that housing wall. FIG. 10 shows camera 101 inverted from the position shown in FIG. 9 and turned end for end so that its back end wall 109 is visible. A cover door 111, which is shown in its open position, is attached to the camera housing by hinges 112. When closed, door 111 is in light-tight cooperation with the camera housing and is retained in that position by a latching device that is releasable by slidable latch release button 113 adjacent the rear viewfinder lens 114 in the back camera wall 109. Operating ear 115 of a pivotally movable film advancing lever is also partially visible in FIG. 10, and is substantially flush with the camera housing except during a film advancing operation. From these two figures, it will be apparent that the camera is very compact and streamlined and is notably free of protruding elements which might interfere with conveniently carrying it in a shirt pocket or the like.

Because FIGS. 9 through 21 all illustrate camera mechanisms in the same inverted orientation shown in FIG. 10, relative positional terms, such as above and below, used in describing those figures will be understood to relate to that inverted mode of orientation. For example, in referring to FIG. 10, film cartridge assembly 41 would be described as being above the camera 101.

As best shown in FIG. 10, the interior of the camera housing defines a shallow internal pocket 116 of the same asymmetrical peripheral shape as the casing of the film cartridge assembly and with a central circular cavity 117 adapted to receive the film disk hub. The camera housing 108 defines lateral walls 118 and 119 and end wall 121 of this pocket and its remaining end wall 122 and diagonal corner walls 123–126 are defined by a cover plate 127 which is held in place by screws 128. A circular central opening 129 in cover plate 127 exposes rotatable circular driving disk 131 that is pivotally supported by stationary hub spindle 132. The driving disk, in turn, carries coupling pin 133, corresponding to pin 75 shown in FIG. 7. A rectangular opening 134 in the cover plate accommodates the rectangular film support frame 135, which extends slightly above the adjacent flat face of the cover plate. When the cartridge assembly is installed in this pocket, the spindle hole 45 in the film disk hub receives the end of spindle 132; driving pin 133 enters coupling hole 44 in the hub; and the film support frame enters the cartridge assembly's rectangular film exposure window 67. Because of the asymmetry of the cartridge assembly and the corresponding configuration of the pocket, the cartridge assembly cannot be inserted into the pocket except in this proper mode of orientation. When the cover door 111 is closed following installation of the film cartridge assembly, a transparent cover door window 136 bears against the hub support plate of the cartridge assembly and maintains the latter in contact with driving disk 131. A circular window rim 137 integral with the camera's cover door 111 surrounds the hub support plate of the cartridge assembly thereby preventing light from entering the interior of the camera through window 136.

A rectangular pressure plate or platen 138 is attached to the cover door by a pair of resilient spring arms 139 which bias it away from the door. When the door is closed, this plate is aligned with film support frame 135, but is held out of clamping engagement with the film cartridge assembly by the engagement of pressure plate ear 140 with a pressure relieving finger 141, which projects through a corresponding opening 142 in cover plate 127 adjacent film support frame 135.

A mechanism plate 143, preferably made of relatively heavy sheet metal, is best shown in FIGS. 11 through 13. This plate is rigidly supported within the camera housing below the cover plate, which is spaced slightly above the mechanism plate by appropriate spacer means, not shown. For example, screws 128 can extend through the cover plate, through appropriate space washers, through corresponding holes in the mechanism plate, one of which is at numeral 144 and into appropriate threaded bosses molded into the camera housing. The mechanism plate supports the principal operative mechanical and optical camera components as a unitary subassembly, thereby facilitating assembly and servicing of the camera and insuring permanent stability in the relation of those components to one another.

The hub support spindle 132, shown in detal in FIG. 14, is permanently staked to the mechanism plate by its riveted lip 145 and rotatably supports circular driving disk 131 and film advancing lever 146. The upper end of spindle 132 fits accurately into spindle hole 45 in the film disk hub of the film cartridge assembly and thereby precisely defines the axis of rotation of the film disk. When the cartridge assembly is received in the camera with its film disk hub in engagement with spindle 132, the film support frame 135 extends through the exposure window 67 of the cartridge assembly casing and engages the face of the cover slide segment 52. Rotation of the cover slide segment out of alignment with casing window 67 causes the film support frame to pass through window 70 in the baffle sheet to engage and support the emulsion surface of the film disk surrounding the film exposure area.

The film support frame 135 is an integral part of a gate member 147, best shown in FIGS. 15 and 16, which is immovably attached to the mechanism plate by screws 148 with the frame extending upwardly through opening 134 in the cover plate. Frame 135 is cantilevered from the gate member to provide a slot 149 between the frame and the mechanism plate to accommodate blades 151 and 152 of the camera's shutter. Rectangular opening 153 in the frame is aligned with a similarily shaped opening 154 in the mechanism plate, such openings being slightly larger than the exposure areas of the film disk. To prevent deflection or bending of the frame, a support post 155 is located at the otherwise unsupported end of the frame beyond the movement path of the shutter blades and bears against an ear 156 of the mechanism plate. Below openings 153 and 154, prism 157 is rigidly supported to the mechanism plate by bracket 158 in optical alignment with the camera's objective lens 103, which is also preferably supported either to the gate member or the mechanism plate. The axis of the objective lens is substantially parallel to the plane of the film cartridge but prism 157, or an equivalent mirror, bends the optical path of the objective lens through a 90° angle so that the focal plane of the lens is coincident with the predetermined flat film plane defined by the flat upper film engaging face 159 of the film support frame. During each exposure of the film disk, pressure plate 138 resiliently bears against the flexible casing of the film cartridge assembly and thereby presses the corresponding region of the film disk against face 159 of the film support frame to position the film exposure area accurately in coincidence with the plane defined by that face. Alternatively, the window in the baffle sheet could be smaller than the window in the casing and face 159 of the film support frame could engage the region of the baffle sheet surrounding its window, in which case the thickness of the baffle sheet would be compensated for in establishing coincidence between the film plane and the focal plane of the objective lens.

The single reflecting surface in the optical path produces a reversed image, but this reversal can be corrected for projection or printing purposes, either by inverting the developed film disk in the projector or printer or by incorporating another single reflecting element in the projection path of such an apparatus. FIG. 19 shows the various lenses comprising the viewfinder except for its front lens 104, all of such lenses being located along an axis 161 below the mechanism plate and substantially parallel to the axis of the objective lens 103. To provide a single lens reflex type of camera construction, the reflective surface of prism 157 can be partially light transmissive and aligned with the axis of appropriate viewfinder elements or a movable mirror can be substituted for that prism, as is well known in the prior art.

As best illustrated in FIGS. 11 and 14, the circular driving disk 131 is provided on its lower face with a pinion gear 162 meshed with gear teeth 163 of a sector plate 164 that is pivotally supported to the mechanism plate by a stud 165 for arcuate movement between two stationary stop pins 166 and 167. A relatively strong hairpin spring 168 biases sector plate 164 in a counterclockwise direction. Whenever the camera is in an unloaded condition, spring 168 holds sector plate 164 against pin 166, as shown in FIG. 11. Accordingly, coupling pin 133 on driving disk 131 is positioned to be received in the cartridge hub coupling hole of a film cartridge assembly being loaded into the camera. An arcuate ratchet tooth segment 169 of the sector plate is engageable by a releasable ratchet pawl 171 under the influence of spring 172 to limit rotation of the film disk hub to a counterclockwise direction.

The film advancing lever 146 includes an arm 173 that extends through a slot 174 in lateral wall 119 of the camera housing. An ear 176 extends downwardly from arm 173 through an arcuate slot 177 in the mechanism plate and is attached to a relatively strong spring 178 that biases lever 146 in a counterclockwise direction toward the position shown in FIG. 11, in which arm 173 is in abutment with end 179 of slot 174. By means of operating ear 115 at the end of arm 173, the photographer can manually rotate lever 146 through an angle of somewhat more than 45 degrees to the position shown in FIG. 12, which is defined by the abutment of that arm against the opposite end 181 of slot 174.

Advancing pawl 182 is pivotally mounted to the advancing lever by a stud 183 extending through an elongate slot 184 in pawl 182. A coil spring 185 connects the advancing pawl to the film advancing lever to resiliently bias that pawl toward the position shown in FIG. 11. In this position that pawl bears against pin 186 on lever 146 with the centrally located end of slot 184 in contact with stud 183. When the advancing lever is positioned as shown in FIG. 11, advancing tooth 187 of the advancing pawl is located adjacent the film support frame near the center of the 90° open area of the film disk hub, which is shown in phantom lines in FIGS. 11, 12, and 13. As the photographer moves lever 146 from the position shown in FIG. 11 to the position shown in FIG. 12, the advancing tooth 187 moves along an arcuate path coincident with the movement path of the hub index ears. When this movement brings the sloped face 188 of tooth 187 into contact with the hub index ear 43 (a), corresponding to the first available exposure area on the film disk, the engagement of ratchet pawl 171 with the sector plate prevents tooth 187 from rotating the hub in a clockwise direction. The tooth therefore cams past index ear 43a by overcoming the biasing force of spring 185 and moves to the position in which it is shown in FIG. 12.

Positioning pawl 189 is pivotally mounted to the mechanism plate by an eccentric pivot stud 191 and is biased in a counterclockwise direction by a spring 192. Leg 193 of the positioning pawl carries a positioning tooth 194 that is located adjacent the advancing tooth 187 when the advancing pawl is positioned as shown in FIGS. 11 and 13. As best shown in FIG. 17, the positioning tooth lies below the advancing tooth and an upwardly turned ear 195 on the positioning pawl engages the adjacent edge of the advancing pawl to establish the location of the positioning pawl when the film advancing lever is in the position shown in FIGS. 11, 13 and 17. A second leg 196 of pawl 189 defines a cam surface 197 engageable by a cam pin 198 on film advancing lever 146. When lever 146 is in its initial position, shown in FIG. 11, pin 198 is out of engagement with cam surface 197 and positioning tooth 194 is positioned to intercept the index ear 43a of the cartridge hub as the latter is rotated. Whenever the advancing lever is displaced by more than approximately 10° from its initial position, however, the cooperation between cam surface 197 and cam pin 198 pivots pawl 189 to the position shown in FIG. 12, thereby moving positioning tooth 194 beyond the movement path of the hub index ears.

As the advancing lever 146 is returned by spring 178 from the position shown in FIG. 12 to the position shown in FIG. 11, the radial face 199 of advancing tooth 187 engages index ear 43a and thereby rotates the film disk hub and the driving disk in a clockwise direction in opposition to spring 168. During the final return movement of lever 146 toward its initial position, cam pin 198 disengages cam surface 97 of the positioning pawl and spring 192 causes the positioning tooth 194 to move back into the path of movement of index ear 43a, which then abuts against that tooth. As shown in FIG. 13, this abutment between the index ear and the positioning tooth occurs slightly before spring 178 has returned arm 173 of lever 146 into contact with the end face 179 of slot 174. Because spring 178 is stronger than spring 185, pawl 182 is displaced slightly endwise relative to lever 146, in opposition to spring 185; whereby the advancing tooth resiliently clamps index ear 43a against radial face 201 of the positioning tooth. The indexing accuracy with which the film exposure area is located in exposure position is thus determined solely by the accuracy with which the hub hole 45 fits the spindle 132 and by the location of positioning tooth 194. To simplify the manufacture of the camera, the eccentric pivot stud 191, best shown in FIG. 18, is riveted to the mechanism plate as shown at numeral 202 but can nevertheless be rotated by means of screwdriver slot 203. The cylindrical bearing surface 204 of this stud that extends through spacer washer 205 and through a mating hole 206 in pawl 189 is slightly eccentric relative to the axis of the stud shank 207, thereby allowing a factory adjustment of the locating tooth position. Once this adjustment has been made, the accuracy of the mechanism is preserved by the fact that the spindle 132, stud 191, the gate member 147 and the optical elements 103 and 157 are all rigidly affixed to the one-piece mechanism plate.

After the first exposure area has been exposed, as described later, a second reciprocative movement of lever 146 causes the advancing pawl tooth 187 to engage hub index ear 43b and to rotate the hub to bring that ear into indexing engagement with the positioning tooth 194. As previously described, the cooperation between cam surface 197 and cam pin 198 causes the positioning tooth 194 to disengage index ear 43a before pawl 182 initiates the counterclockwise rotation of hub 42, and to return the positioning tooth to its operative location before the next index ear arrives at its indexed position. After the film disk indexing operation has been repeated ten times to bring the final exposure area into exposure position, the 90° open area of the hub is located clockwise from the advancing tooth 187, whereby the arcuate travel of that tooth is insufficient to re-engage it with index ear 43a. Accordingly, further reciprocation of lever 146 has no effect on the position of the film disk, which is additionally prevented from moving further in a counterclockwise direction by the abutment of sector plate 164 against stop pin 167.

If, during the previously described indexing operations, the film disk should jam within the cartridge assembly casing, the spring biased pin and slot connection between pawl 182 and film advancing lever 146 prevents the photographer from damaging the camera mechanism by attempting to force lever 146 back to its initial position.

Because of the spacing of the hub index ears 43, the first indexing operation requires film advancing lever 146 to be reciprocated through an angle of slightly more than 45 degrees, but subsequent indexing operations require the lever to be moved through an angle of only slightly more than 30 degrees. However, as explained below, the shutter cocking operation requires that lever 146 be reciprocated through its maximum angular movement each time the film disk is advanced. To ensure such movement of lever 146, an anti-short-stroke dog 208, shown in FIGS. 12 and 13 is pivotally carried by stud 165 below sector plate 164 and is resiliently biased to its depicted central position by a wire spring 209 staked into a slot in dog 208 and extending freely between pins 211. During the movement of lever 146 from the position shown in FIG. 11 to the position shown in FIG. 12, arcuately disposed teeth 212 along the adjacent edge of lever 146 engage finger 213 of dog 208 and rotate the latter in a counterclockwise direction as those teeth move past the dog finger in ratchet fashion. Consequently, once the clockwise movement of lever 146 is initiated, that lever cannot rotate in the opposite direction until it has reached the position shown in FIG. 12 at which arcuate notch 214 in lever 146 is aligned with the dog tooth and allows the dog to reassume its depicted central position. During the subsequent return movement of lever 146, the dog performs in the same manner as teeth 212 displace it in a clockwise direction. When lever 146 arrives at its initial position, arcuate notch 215 is aligned with the dog, which therefore again assumes its central position.

The shutter mechanism, which is best depicted in FIG. 19 comprises an opening member 216 and a closing 217, both of which are made of thin sheet steel. These two members are pivotally supported below the mechanism plate between washers 218 by the lower end shank 219 of spindle 132, as shown in FIG. 14, and are retained on that shank by a snap ring 221. Two springs, represented at numerals 222 and 223 in FIG. 19, bias the respective opening and closing shutter members 216 and 217 in a counterclockwise direction. The shutter member legs 224 and 225 include respective upwardly bent portions 226 and 227 that extend through corresponding arcuate mechanism plate openings 228 and 229, shown in FIGS. 11-13. Opening and closing shutter blades 151 and 152, carried by the respective shutter member legs 224 and 225, are parallel to the mechanism plate in alignment with the shutter blade slot 149 below the film support frame 135.

FIG. 11 depicts the camera with its shutter in released condition, in which the opening shutter blade 151 slightly overlaps the closing shutter blade 152, with the latter blade obscuring the rectangular opening 153 of film support frame 135. In this condition, the position of opening member 216 is established by the engagement of its upwardly bent portion 226 with the adjacent end of mechanism plate opening 228 and the position of closing member 217 is established by the abutment of its leg 225 with downwardly bent ear 233 of opening member 216, shown in FIG. 19. As the film advancing lever 146 is rotated in a clockwise direction, edge 234 of that lever engages the upwardly bent portion 226 of the opening member 216 and moves the two blades in unison in a clockwise direction.

When the clockwise movement of the shutter members has brought the opening blade into alignment with the film support frame opening 153, as shown in solid lines in FIG. 19, latch tooth 235 on the opening shutter member 216 is engaged by a primary latch member 236, which is pivotally mounted to the mechanism plate by pin 237 and biased in a clockwise direction by hairpin spring 238. A secondary latch member 239, pivotally mounted to the mechanism plate by pin 241 and biased in a clockwise direction by hairpin spring 242 similarly engages a latch tooth 243 on the closing shutter member 217. Accordingly, the two shutter members are held in their respective cocked positions as the advancing lever 146 returns to its initial position to complete the film indexing and shutter cocking operation.

As also shown in FIG. 19, an ear 244 on leg 225 of the closing shutter member 217 is in engagement with the adjacent end face of an electromagnet 245 when the shutter is in its cocked condition. This electromagnet is carried by a support member 246 that is pivotally supported to the mechanism plate by a rivet 247 and biased in a counterclockwise direction by a spring 248 for movement through a narrow arcuate path limited by stationary pin 249 extending into slot 251 in the support member. This movable mounting of the electromagnet allows it to engage ear 244 of the closing shutter member when the latter is in its cocked position, while allowing that member to be moved slightly beyond its cocked position by the film advancing lever during the film indexing and shutter cocking operation.

When the primary latch member 236 is released from latch tooth 235 of the opening shutter member 216, as described below, the latter rotates rapidly in a counterclockwise direction; thereby removing opening blade 151 from alignment with the film support frame opening 153 to initiate the exposure of the film area supported by the film support frame. As the opening shutter member approaches its released position shown in FIG. 11, cam nose 252 on that member engages the rounded tip of the secondary latch member engaged with latch tooth 243 on the closing shutter member and pivots that latch member out of engagement with the closing shutter member. If the camera's exposure control circuit has not energized electromagnet 245, the release of the secondary latch member causes the closing shutter member to immediately pivot in a counterclockwise direction so that its blade 152 covers the opening in the film support frame, thus providing a mechanically predetermined exposure interval. However, if the automatic exposure control system requires a longer exposure duration, electromagnet 245 retains the closing shutter member in its cocked position until the electromagnet is de-energized, whereupon the shutter closes. Becuase this general type of automatic exposure control system is well known in the prior art, details of the electronic circuitry associated with controlling the energization of the electromagnet have been omitted.

Shutter release rocker 253, shown in FIGS. 19 and 20, is supported for rocking movement below the mechanism plate by rivets 254 and 255 extending through corresponding ears 256 and 257 on that rocker and through respective tongues 258 and 259 bent downwardly from the mechanism plate. The rectangular shutter operating button 106 is attached to the lower face of rocker 253, as shown in broken lines in FIG. 19, and extends though a corresponding opening in the camera housing. A hairpin spring 260 is coiled around the head of rivet 254 with one of its legs engaging a finger 261 of rocker 253 and with its other leg bearing against the mechanism plte; thereby urging the release button downwardly towards its extended position. At its forward end, rocker 253 is provided with finger 141, which projects upwardly through the mechanism and cover plates and abuts against ear 140 on pressure plate 138 when the camera's cover door is closed. Spring 261 is strong enough to overcome the tension of spring arms 139 supporting the pressure plate, whereby the latter is retained out of clamping engagment with the film cartridge assembly as long as the shutter operating button remains in its extending position.

Release slide 262, shown in FIGS. 19 and 20, is slidably mounted to the lower face of the mechanism plate by stationery rivet 263 extending through a slot 264 and is biased toward the right and also in a counterclockwise direction by spring 265. When slide 262 is in its cocked position shown in solid lines in FIG. 19, its latch tooth 266 is engaged with finger 267 of latching tab 268, which extends upwardly from rocker 253, as best illustrated in FIG. 20. When the shutter operating button is depressed, the corresponding upward movement of finger 267 causes it to disengage latch tooth 266, whereupon spring 265 moves slide 262 to the right to the position shown in broken lines in FIG. 19, which is defined by the abutment of the left end of slot 264 with rivet 263. During this movement, releasing ear 271 on slide 262 engages the lower fingers 272 of primary shutter latch 236 and releases the latter from opening shutter member tooth 235 to initiate the operation of the shutter. As previously mentioned, prior to releasing the shutter, the movement of the release rocker finger 141 causes pressure plate 138 to squeeze the exposure area of the film disk into engagement with the film support frame to insure that the film exposure area is securely held in flat condition during its exposure.

As shown at numeral 273 in FIGS. 11, 12, 13 and 19, a cocking pin projects downwardly from film advancing lever 146 through an arcuate slot 274 in the mechanism plate. This pin is adapted to engage tongue 275 on release slide 262, shown in FIGS. 19 and 20, to restore that slide to its cocked condition shown in FIG. 19 when lever 146 is again moved to the position shown in FIG. 12. During this recocking movement of slide 262, it pivots slightly in a clockwise direction out of contact with guide pin 276 as latch tooth 266 cams past finger 267 of latching tab 268.

Stop pin 277, extending upwardly from the shutter release rocker 253, projects through the corresponding end of slot 274 in the mechanism plate beyond the movement path of pin 273 and is flush with the lower face of lever 136 when the shutter operating button is at its extended postion. When the film advancing lever is in the position shown in FIGS. 11 and 13, edge slot 278 in that lever is aligned with the end of stop pin 277 so that the film advancing lever does not interfere with depression of the release button. Whenever the advancing lever is moved away from its inital position, however, the shutter operating button cannot be depressed beacuse of the abutment of pin 277 with the lower face of that lever. Similarly, as long as the shutter operating botton remains depressed, pin 276 prevents lever 146 from being moved out of its inital position. Consequently, the film disk cannot be rotated unless the shutter operating botton has first been released to retract pressure plate 138 out of clamping engagement with the film cartridge assembly.

Blocking slide 279, shown in FIG. 19 is slidably and rotatably mounted to the lower face of the mechanism plate by a rivet 281 extending through elongate slot 282 and is biased both rearwardly and in a clockwise direction by a spring 283. After the completion of each film advancing and shutter cocking operation, slide 279 assumes the position shown in solid lines, in which edge surface 284 of the slide is in abutment with stationary pin 285 and in which ear 176 of film advancing lever 146 is trapped behind blocking tooth 286 of the slide to prevent lever 146 from being moved out of its initial position. As previously explained, depression of the shutter operating button causes the release slide 262 to move to the right to the position shown in broken lines to initiate the shutter operation. This movement of slide 262 causes its ear 287 to engage the rearward end of the blocking slide and to rotate the latter in a counterclockwise direction about rivet 281 in opposition to spring 283, thereby moving edge surface 284 out of engagement with pin 285. Thereupon, spring 283 moves slide 279 rearwardly to the position shown in broken lines, in which pin 285 is engaged with edge 288 of the blocking slide to locate tooth 286 beyond blocking engagement with ear 176 of the film advancing lever. Accordingly, that lever can again be operated to advance the film disk and to recock the shutter. As the film advancing lever approaches the position shown in FIG. 12 during this subsequent film advancing and shutter cocking operation, its ear 176 engages tongue 289 of slide 279 and moves the latter forwardly so that it can again assume the position shown in solid lines. During the return movement of lever 146 to its initial position, its ear 176 encounters the sloped face 291 of the blocking tooth 286 and momentarily cams the latter aside to allow ear 176 to return to its blocked position. This camming action momentarily displaces the blocking slide slightly in a counterclockwise direction, but not far enough to disengage edge surface 284 from pin 285. Accordingly, as soon as ear 176 has moved rearwardly beyond blocking tooth 286, blocking slide 279 reassumes the position shown in solid lines and prevents further reciprocation of the film advancing lever until after shutter has been operated. Thus, the blocking slide ensures that each exposure area is exposed before the film disk is again indexed to bring the next available exposure area into exposure position.

The door latch mechanism, best shown in FIG. 21, includes a latch slide 292 slidably mounted above the mechanism plate 143 on pins 166 and 293 anchored to that plate and extending through respective latch plate slots 294 and 295 and a release slide 296 slidably mounted below the mechanism plate by the opposite ends of the same pins extending through release slide slots 297 and 298. An ear 299 projects upwardly through opening 301 in the mechanism plate 143 and is adapted to engage the right edge 302 of projection 303 on the latch slide. The release slide 296 is biased toward the right by a spring 304 attached to pin 305 on the mechanism plate. A stronger spring 306 connects the release slide to latch slide finger 307, which extends downwardly through mechanism plate opening 301, and thereby resiliently biases edge 302 of slide 292 against ear 299 of slide 296. These two springs thus cooperate to normally retain the two slides in their respective positions shown in FIG. 21, with pins 166 and 293 engaging the left ends of slots 294 and 295 in latch slide 292 and passing through the centers of slots 297 and 298 in release slide 296. When the latch slide is in this position, and assuming that the camera cover door 111 is closed, latch tooth 308 of the latch slide is engageable with the corresponding latch tooth 309 on the door to retain the latter in its closed condition.

When the latch release slide is moved to the left, by means of its externally accessible latch release button 113, ear 299 of that slide moves the latch slide 292 in the same direction and thereby moves the latch slide tooth 308 out of engagement with door tooth 309 to permit the door to be opened. However, as best shown in FIG. 13 sector plate 164 is located immediately above the latch slide and obstructs such leftward movement of ear 299 of the latch release slide except when sector plate notch 311 is aligned with that ear, which occurs only when the driving disk 131 is in its initial position shown in FIGS. 10, 11 and 12.

As previously explained, the counterclockwise indexing movement imparted to the film unit hub by advancing pawl 182 drives the sector plate in a clockwise direction in opposition to spring 168 and the engagement of rachet pawl 171 with the rachet teeth 169 on the sector plate prevents the latter from rotating in the opposite direction. Consequently, whenever the film disk is rotated to an exposure position, the latch slide button cannot be moved to the left to open the camera until the driving disk has first been returned to its initial position to relocate the cover slide over the exposure window of the cartridge assembly casing.

To open the camera door after one or more film exposures have been made, the photographer first moves button 113 to the right in opposition to spring 306, thereby causing release slide ear 299 to engage finger 312 on ratchet pawl 171 and to withdraw the latter from engagement with sector teeth 169. At its opposite end, release slide 296 is provided with a finger 313 extending upwardly through a hole 314 in the mechanism plate. When the latch release slide is moved to the right to disengage ratchet pawl 171 from sector teeth 169, this finger 313 simultaneously engages and displaces the adjacent end of advancing pawl 182, thereby pivoting the latter in a counterclockwise direction about stud 183, which simultaneously rotates positioning pawl 189 in a clockwise direction about stud 191 because of the engagement of the advancing tooth end of pawl 182 with positioning pawl ear 195, best shown in FIG. 17. Accordingly, advancing tooth 187 and positioning tooth 194 are both moved beyond the path of movement of the hub index ears to allow spring 168 to rotate driving disk 131 back to its initial position, thus repositioning the cover slide over the film unit's exposure window and allowing the latch release slide to now be moved to its extreme left position to release the cover door.

If a malfunction were to prevent spring 168 from returning the film disk hub to its initial position, for example because of jamming of a faulty magazine assembly, the interlock system just described would prevent the camera from being opened and would thereby make it impossible to correct the malfunction. Therefore, provision is also made for allowing the cover door to be opened under extraordinary circumstances regardless of the orientation of the sector plate. This is accomplished by inserting a pin or similar tool through hole 315 in the camera casing in alignment with end face 316 of latch slide 292 and thereby forcing the latch slide to its unlatching position in opposite to spring 306.

FIGS. 22 through 24 illustrate, somewhat schematically, an even simpler version of a manually operated film disk indexing mechanism that can readily be incorporated with other features of the camera previously described and which likewise insures that the camera cannot be opened until the rotatable cover slide of the film cartridge assembly is returned to a position at which it closes the exposure window.

For use with this particular indexing mechanism, the film disk hub 351, shown in broken lines, is similar to the previously described film disk hub 42, but additionally includes a notch 352 located somewhat off center in the 90 degree open area of the hub. While such a notch would serve no purpose in cooperation with the previously described indexing mechanism, a hub with this feature is completely compatible with that type of mechanism.

When the film cartridge assembly is installed in the camera, the central hub hole 353 receives a stationary hub support spindle 354 that also pivotally supports a film advancing lever 355. This lever carries a film advancing pawl 356, which is attached to the lever by pin 357 and spring 358 in the same manner previously described with reference to FIGS. 11–13. A positioning pawl 359 is pivotally supported by an eccentric adjustment screw 361 and is biased in a counterclockwise direction toward a stop pin 362 by a weak spring 363. When the cartridge assembly is initially loaded into the camera, the advancing tooth 364 of film advancing pawl 356 is received in notch 352 and the positioning tooth 365 of pawl 359 is retained beyond engagement with the adjacent peripheral hub surface 366 by pin 362. Flexible pawl springs 367 and 368 are adapted to engage the adjacent index ears on the hub to prevent the latter from rotating in a clockwise direction beyond a position at which the film advancing pawl can engage the next index ear during each film indexing operation.

As film advancing lever 355 is rotated in a clockwise direction, the advancing tooth 364 of pawl 356 rides over the first index tooth 43a and cam surface 369 on the advancing pawl engages pin 371 on the positioning pawl and raises the positioning tooth to a position beyond the movement path of the hub's index ears. As shown in broken lines in FIG. 22, the clockwise movement of lever 355 is limited by stop pin 372 so that the advancing pawl tooth 364 moves only far enough to insure its engagement with the hub index ear 42a associated with the next available exposure area. As lever 355 is returned in a counterclockwise direction back to its initial position by spring 373, the pawl tooth 364 advances the film disk and brings index ear 42a into abutment with the positioning tooth 365, which has returned to its operative position during the final return movement of lever 355. As shown in FIG. 23, the index ear 43a is thus resiliently squeezed against the positioning tooth 365 by the advancing pawl tooth 364 in the same manner previously described. By repeating this operation, the photographer can bring each successive exposure area into exposure position. Additionally, each film advancing movement of lever 355 can also serve to cock the shutter and to perform other camera functions, as previously described.

After the last exposure area has been brought to exposure position, the next reciprocative movement of lever 355 causes advancing pawl tooth 364 to engage face 374 of hub notch 352 and to thereby rotate the hub through an angle sufficient to close the exposure window with the cover slide without quite completing a 360 degree rotation of the hub. A cartridge assembly provided with such a notched hub is also modified by widening the upper slot in its dihedral locking boss so that the hub is locked against further rotation by this final indexing movement. As best illustrated in FIG. 24, because of the off-center position of notch face 374 between index ears 43a and 43j, which results in the slightly less than 360 degree rotation of the hub, index ear 43a is now beyond the position at which it can be engaged by the advancing pawl tooth, which is shown in its extreme clockwise position in broken lines, thereby avoiding reexposure of the first exposure area.

The door latching device is schematically represented in FIG. 22 by slidable latch member 375, which is movable to the left in opposition to spring 376 by slide button 377 to disengage latch tooth 378 from a corresponding latch member carried by the camera door. A pin 379 on latch member 375 engages cam surface 381 of a pivotally mounted blocking member 382 and pivots the latter in a counterclockwise direction about its pivot pin 383 when the latch member is moved to the left to release the door. Locking arm 384 is pivotally mounted by stud 385 and includes a nose 386 urged into contact with cam surface 369 of film advancing pawl 356 by spring 387. When the advancing tooth 364 of pawl 356 is received within hub notch 352, the locking arm assumes the position shown in solid lines in FIG. 22, in which its shoe 388 is positioned beyond the movement path of finger 389 on blocking member 382, thereby allowing the latter to be rotated in a counterclockwise direction by the door releasing movement of the slidable latch memberr. When the hub 351 is in any other rotational position, however, the resulting forward displacement of nose 386 causes locking arm 384 to be rotated in a clockwise direction from its illustrated position as shown in broken lines in FIG. 22, whereby shoe 388 blocks counterclockwise rotation of blocking member 382 and thereby prevents the latch member from being moved to the position at which the door is released. Consequently, the door cannot be opened unless the hub 351 is at a position at which the cover slide closes the exposure window of the cartridge assembly casing.

FIGS. 25 through 28 schematically depict still another illustrative camera mechanism, which is designated as an automatic film advance mechanism, because the energy required to accomplish all of the successive indexing movements of the film disk is imparted to the mechanism during the operation of loading the camera.

As in the previously described embodiments of the invention, this camera mechanism comprises a stationary hub support spindle 401, adapted to be received in the central hole of the film disk hub, shown in broken lines at numeral 42. A driving disk 402, similar to the previously described disk 131, is rotatably supported by spindle 401 and includes a pinion 403 and a plurality of peripheral teeth 404 spaced at 30 degree intervals to one another to correspond to the spacing between adjacent index ears of hub 42. A drive sector 405, in engagement with pinion 403, is pivotally mounted on stud 406 and is biased in a clockwise direction by a relatively strong hairpin spring 407. When the sector is in the position shown in FIG. 25, driving disk 402 is thereby oriented with its coupling pin 408 aligned between spindle 401 and the rectangular exposure opening 409 of the camera's film support frame structure, thereby allowing a film cartridge assembly to be installed in the camera in mating engagement with the driving disk.

A loading lever 411 is also pivotally mounted on stud 406 and includes an ear 412 engageable with edge 413 of sector 405. To open the camera, the cocking lever is rotated in a counterclockwise direction from the position shown in broken lines in FIG. 25 and in solid lines in FIG. 28 to the position shown in solid lines in FIG. 25, thereby causing the sector and the driving disk to assume the respective positions in which they are depicted in solid lines in FIG. 25.

A latch slide 414, best illustrated in FIGS. 27 and 28, is slidably mounted to the camera housing, not shown, by rivet pins 415 and 416 extending through an L-shaped slot 417 in slide 414. A spring 418 biases slide 414 both to the left and also in a clockwise direction about pin 416. The camera's cover door, partially depicted at numeral 419, is shown in FIG. 26 in its closed position and in FIG. 27 in a partially open position. When door 419 is closed, slide 414 assumes the position shown in FIG. 26 with pins 415 and 416 both received in the horizontal leg 421 of slot 417 and with slide tooth 422 in engagement with latch tooth 423 on the cover door to retain the latter in its closed condition. As loading lever 411 arrives at the position shown in solid lines in FIG. 25, it engages shoulder 424 of latch slide 414 and displaces the latter to the right in opposition to spring 418 to disengage slide tooth 422 from latch tooth 423 on the cover door. Just before teeth 422 and 423 are disengaged, however, vertical leg 425 of slot 417 moves in alignment with pin 415, whereupon spring 418 rotates the slide in a clockwise direction about pin 416 to move slide ear 426 to a position to the left of lever 411. After the photographer has completed the clockwise movement of the lever and has at least partially opened door 419, ear 426 retains lever 411 in the position shown in solid lines in FIGS. 25 and 27, thereby maintaining sector 405 in the position shown in FIG. 25 as long as the cover door remains open. When the cover door is subsequently pressed to a closed position, edge 427 of the door engages the upper edge of slide tooth 422 and urges the latter downwardly so that pin 415 is again aligned with the horizontal leg 421 of slot 417; whereupon spring 418 returns the slide to its latched position shown in FIG. 26 and thereby releases arm 411, which is returned by spring 428 to its position shown in solid lines in FIGS. 28 and in broken lines in FIG. 25.

After the camera door has been closed, lever 411 no longer opposes the clockwise rotation of sector 405 by spring 407. Accordingly, the sector now imparts counterclockwise rotation to the driving disk and thereby to the film disk hub. As the latter rotates in a counterclockwise direction, its index ear 43a, aligned with its first available exposure area, rotates into abutment with positioning tooth 429 of pivotally supported positioning lever 430. Accordingly, the rotatable cover slide is removed from alignment with the exposure window of the cartridge assembly casing and the first available exposure area is aligned with the exposure opening 409 in the film support frame.

The shutter structure comprises an opening shutter blade 431 and a closing shutter blade 432, which are located in superimposed relation to each other and supported for sliding movement by suitable support means, not shown. The shutter blades are shown in FIG. 25 in their respective cocked positions, in which aperture 433 in the closing shutter blade 432 is aligned with exposure opening 409 and in which aperture 434 in the opening shutter blade 431 is located to the right of opening 409. The engagement of the opening shutter blade pin 435 with tooth 436 of pivotally mounted latch lever 437 retains that blade in its cocked position in opposition to spring 438 and the engagement of tooth 439 on the closing shutter blade with tooth 441 of pivotally supported latch arm 442 similarly retains that blade in its cocked position in opposition to spring 443.

Shutter release member 444 is schematically depicted as being slidably supported by pins 445 extending through an elongated slot 446 and is biased forwardly to its inoperative position shown in FIG. 25 by a spring 447 attached to a pivotally supported lever 448. It should be understood that this representation of the shutter release member is merely illustrative, and that such a member preferably would be located as illustrated in FIG. 9 and connected with the shutter by appropriate linkage means.

As shutter release member 444 is moved rearwardly to effect an exposure, its initial movement pivotally displaces lever 448 to move its finger 449 out of supporting engagement with pressure plate ear 451. Finger 449 and ear 451 correspond respectively to finger 141 and pressure plate ear 140, which were described previously with reference to FIGS. 9-21. This initial movement of the shutter release member causes the camera's pressure plate to squeeze the film against the film support frame. The continuing rearward movement of member 444 then brings its ear 452 into contact with latch member 437 and pivots the latter in a clockwise direction about its pivot stud 453 to the position shown in solid lines in FIG. 28. This movement of member 437 disengages its tooth 436 from opening shutter member pin 435 and positions its tooth 454 in alignment with pin 455 on that same blade. Accordingly, exposure of the film is initiated as spring 438 moves the opening shutter blade to its intermediate position, shown in solid lines in FIG. 28, in which pin 455 on that blade is engaged by tooth 454 of latch member 437 and in which the opening blade aperture 434 is aligned with opening 409 of the film support frame and with aperture 433 of the closing blade 432. As the opening shutter blade arrives at its intermediate position, its lobe 456 engages lobe 457 on latch arm 442 and disengages the latter from tooth 439 on the closing shutter blade, thereby allowing spring 443 to move the closing blade to its intermediate position, defined by the abutment of its tab 458 with the adjacent edge of the opening shutter blade. This movement of the closing shutter blade terminates the film exposure by moving the closing shutter blade aperture 433 beyond the film support frame opening 409. Thus, the shutter mechanism provides a mechanically predetermined exposure interval, which obviously could be increased by the incorporation of an electromagnet for retarding the motion of the closing blade in the same manner described in connection with FIGS. 11 through 21.

As the shutter release member is returned to its initial position by spring 447, lever 448 causes finger 449 to retract the pressure pad from operative engagement with the film cartridge assembly, whereupon ear 459 of member 444 engages latch lever 437 and returns it to its original position. This movement of the latch lever disengages its tooth 454 from pin 455 of the opening shutter blade and thereby allows both shutter blades to move slightly further to the left to the position shown in broken lines in FIG. 28. During this final movement of the two shutter blades, edge 461 of blade 431 engages nose 462 of positioning lever 430 and rotates the latter about its eccentric pivot pin 463 to the position shown in broken lines in FIG. 28, in which positioning tooth 429 is disengaged from hub index ear 43a. Consequently, sector 405 now drives driving disk 402 and hub 42 in a counterclockwise direction, which causes the driving disk tooth 404a adjacent finger 464 of cocking member 465 to engage that finger and to displace member 465 in a clockwise direction about its pivot stud 466.

Cocking arm 467 is also pivotally mounted to stud 466 below cocking member 465 and is biased in a counterclockwise direction against stop pin 468 by spring 469. A weak hairpin spring 471 biases the cocking member in a clockwise direction relative to the cocking arm to urge edge 472 of the former against tab 473 of the latter. As tooth 404a of the driving disk engages and moves past finger 464 of the cocking member, the resulting clockwise rotation of the latter is imparted to the cocking arm through its tab 473, thus causing that arm to move momentarily to the position shown in broken lines in FIG. 25 and then to return to its initial position. During this movement of arm 467, its head 474 engages finger 475 on the opening shutter blade and returns both blades to their initial cocked positions. As arm 467 initially moves the shutter blades back to their respective cocked conditions, edge 461 of the opening shutter blade moves out of engagement with nose 462 of positioning lever 430 and allows spring 476 to return the latter to its operative position shown in FIG. 25, whereby the rotation of the driving disk and the film hub is again arrested when the next index tooth 43b engages the positioning tooth 429. Accordingly, the next available exposure area is now positioned for exposure and the shutter mechanism is recocked and restored to its initial condition. After the repetition of this operation has exposed all of the available film exposure areas, sector 405 moves into abutment with stop pin 477, thus preventing further counterclockwise rotation of the film disk.

Because latch slide 414 holds loading lever 411 in the position shown in solid lines in FIG. 25 as long as the camera's cover door is open, the film disk in a film cartridge assembly loaded into the camera cannot be rotated until the cover door has been closed, thereby preventing the film disk from being exposed inadvertently to ambient light. If desired, this feature could also be incorporated in the camera shown in FIGS. 9–21 by providing that camera with a simple latch device adapted to lock the film advancing lever 146 in the position shown in FIG. 11 whenever the camera door is open.

To remove the film cartridge assembly, after either all or only some of the available exposure areas have been used, the photographer opens the camera door by moving lever 411 to the position shown in solid lines in FIG. 25, thereby rotating hub 42 in a clockwise direction back to its initial position in which the rotatable cover slide again closes the exposure window of the cartridge assembly casing and in which the hub is now locked against further rotation. During this clockwise rotation of the driving disk, the film hub index ears engage the sloped face 478 of positioning tooth 429 and cams the latter aside in opposition to spring 476 and teeth 404 of the driving disk similarly bypass finger 464 of cocking member 465 by rotating that finger in a counterclockwise direction in opposition to spring 471. Although FIG. 25 shows the shutter in a cocked condition during the camera loading operation, this situation would exist only if the preceeding cartridge assembly were removed prior to exposure of all the available exposure areas. If the preceeding cartridge assembly had been fully exposed, the shutter would remain uncocked, but would be recocked by the initial rotation of the driving disk by which the first available exposure area is brought into exposure position.

FIG. 29 shows a modification of the mechanism depicted in FIGS. 25–28 for use in a camera in which the shutter is cocked other than by the film advancing mechanism, for example, by the final return movement of the shutter release member after that movement has caused the pressure plate to disengage the film cartridge assembly. Because such a previously known shutter cocking mechanism, not shown, eliminates the need for cocking arm 467 and its associated structure, those elements are omitted and positioning lever 430 is provided with an escapement tooth 481 to provide an escapement mechanism. When the final movement of the shutter blades rotates lever 430 to the position shown in broken lines and thereby disengages indexing tooth 429 from a hub index ear, escapement tooth 481 simultaneously moves into the movement path of the adjacent driving disk tooth 404. Accordingly, the film disk is advanced only part way to the next exposure position before tooth 481 temporarily arrests further counterclockwise rotation of the driving disk. When the shutter is recocked by the final return movement of the shutter releasing member spring 476 returns the latch lever to its position shown in solid lines and withdraws its tooth 481 from engagement with the driving disk tooth, whereupon the film disk completes its indexing movement to the position established by the engagement of its next index ear with positioning tooth 429.

FIGS. 30 and 31 show another embodiment of an escapement mechanism functionally similar to the one shown in FIG. 29 but in which both the positioning tooth 483 and the escapement tooth 484 cooperate directly with the hub index ears to provide incremental indexing movements of the film disk hub 42 as it is biased in a counterclockwise direction by the driving disk 485. The positioning tooth 483 is carried by a positioning lever 486, pivotally supported by eccentric pivot stud 487, and is urged toward its operative position shown in FIG. 30 by spring 488. In this position, which is defined by the abutment of lever 486 against pin 489, tooth 483 is engaged with hub index ear 43a to arrest the counterclockwise rotation of the film disk hub and to locate the corresponding film exposure area in exposure position. The escapement tooth 484 is carried by escapement lever 491, which is pivotally supported by pivot stud 492 and provided with a cam face 493 adjacent pin 494 of the opening shutter blade 431 when the latter is in its intermediate position as shown in FIG. 30. An ear 495 on positioning lever 486 engages finger 496 of escapement lever 491 whereby the counterclockwise force supplied to lever 486 by spring 488 biases lever 491 in a clockwise direction against pin 497.

When shutter blade 431 moves to its final uncocked position, as shown in FIG. 31, its pin 494 cams the escapement lever in a counterclockwise direction, whereby its finger 496 moves positioning lever 486 in a clockwise direction in opposition to spring 488. Accordingly, positioning tooth 483 is now released from index ear 43a, allowing the film disk hub to rotate to the position shown in FIG. 31, in which that index ear is engaged with escapement tooth 484. As the shutter is recocked, spring 488 returns both levers to their respective positions shown in FIG. 30, thereby releasing tooth 484 from ear 43a and causing tooth 483 to intercept index ear 43b to complete the film disk indexing operation.

Although the invention has been described with reference to specific illustrative embodiments, it should be understood that various components and features of those embodiments could be used in different combinations and subcombinations with each other and with other camera mechanisms, for example, with electrical drive means, means for energizing flash illumination devices, mirror actuating means in single lens reflex camera applications, etc.

The invention has been described in detail with particular reference to illustrative preferred embodiments thereof, but it will be understood that variations and modifications can be effected within the spirit and scope of the invention as described hereinabove and as defined in the appended claims.

I claim:

1. A camera adapted to receive a film cartridge assembly, the assembly including a generally flat casing enclosing a film disk and having an obverse wall including an exposure window, said camera comprising:

a. film advancing means for imparting rotational movement to a film disk within a film cartridge assembly received by said camera to bring successive exposure areas of the film disk into alignment with the exposure window;
b. a film support member adapted to enter the exposure window of the received film cartridge assembly;
c. a pressure member adapted to engage the received film cartridge assembly;
d. adjusting means for selectively adjusting said pressure member relative to said film support member to:
   (1) a first condition in which said pressure member and said film support member cooperate to cause the film disk to be held with the film disk exposure area aligned with the exposure window located in a predetermined film exposure plane, and to
   (2) a second condition in which the film disk is released from holding influence effected through the cooperation of said pressure member and said film support member; and
e. interlock means operatively associated with said film advancing means and said adjusting means for disabling said film advancing means while said pressure member is in said first condition.

2. A camera adapted to receive a film cartridge assembly, the assembly including a generally flat casing enclosing a film disk and having an obverse wall provided with an exposure window and a reverse wall including a flexible region opposite said exposure window, said camera comprising:
a. film advancing means for imparting rotational movement to a film disk within a film cartridge assembly received by said camera to bring successive exposure areas of the film disk into alignment with the exposure window;
b. a film support member adapted to enter the exposure window of the received film cartridge assembly;
c. a pressure member adapted to engage the flexible region of the received film cartridge assembly;
d. adjusting means for selectively adjusting said pressure member relative to said film support member to:
   (1) a first condition in which said pressure member and said film support member cooperate to exert a holding influence on the film disk for locating in a predetermined film exposure plane the film disk exposure area aligned with the exposure window, and to
   (2) a second condition in which the film disk is released from said holding influence; and
e. film advance disabling means connected to said adjusting means and operatively associated with said film advancing means for disabling said film advancing means while said pressure member is in said first condition.

3. A camera adapted to receive a film cartridge assembly, the assembly including a generally flat casing enclosing a film disk, the casing including an obverse wall and a reverse wall, the obverse wall including an exposure window, said camera comprising:
a. film advancing means for imparting rotational movement to the film disk of a film cartridge assembly received by said camera to bring successive exposure areas of the film disk into alignment with the exposure window;
b. shutter means operable for exposing the exposure area of the film disk aligned with the exposure window of the received film cartridge assembly;
c. a film support member adapted to enter the exposure window of the received film cartridge assembly;
d. a pressure member located in confronting relation to said film support member and engageable with the reverse wall of the received film cartridge assembly, said pressure member being selectively adjustable:
   (1) in a first direction toward said film support member to a first position in which said pressure member cooperates with said film support member to cause the exposure area of the film disk aligned with the exposure window to be held in a predetermined film exposure plane, and
   (2) in a second direction away from said film support member toward a second position in which the film disk is released from holding influence effected through the cooperation of said pressure member and said film support member; and
e. interlock means operatively associated with said shutter means and said pressure member for preventing operation of said shutter means while said pressure member is in said second position.

4. A camera adapted to use a film cartridge assembly, said film cartridge assembly including a casing provided with an exposure window and a film unit assembly including a film disk, a cover slide and a hub member, both said film disk and said cover slide being enclosed within said casing and attached to said hub member, the hub member being accessible from the exterior of said casing for imparting rotational movement to said film unit assembly, said cover slide being adapted to close said exposure window when said film unit assembly is in a predetermined rotational position relative to said casing, said camera comprising:
a. a housing structure including positioning means for receiving and locating a film cartridge assembly in an operative position,
b. film advancing means engageable with the hub of a film cartridge assembly received by said camera for imparting rotation to the film unit assembly of said film cartridge; and
c. coordinating means carried by said housing for preventing removal of said film cartridge assembly from said operative position when said film unit assembly is located other than in said predetermined rotational position relative to said casing.

5. The invention defined by claim 4 wherein said coordinating means includes:
a. a cover door mounted to said housing structure for movement between an open position and a closed position in which said cover door cooperates with said housing structure to define an internal camera compartment within which said film cartridge assembly received by said camera is located in said operative position;
b. latch means movable to a first position for retaining said cover door in said closed position and to a second position for permitting movement of said cover door to said open position;
c. latch blocking means adjustable to an unblocking position for permitting movement of said latch means from said first position to said second position and to a blocking position for preventing movement of said latch means from said first position to said second position; and d. sensing means for sensing the rotational orientation of said film unit assembly relative to said causing and for adjusting said latch blocking means to said unblocking position when said film unit assembly is in said predetermined rotational position relative to said casing.

6. A camera adapted to receive a film cartridge assembly, said film cartridge assembly including a casing provided with an exposure window and a film unit assembly including a film disk, a cover slide and a hub member; both the film disk and the cover slide being enclosed within the casing and attached to the hub member, the hub member being accessible from the exterior of the casing for imparting rotational movement to the film unit assembly, the film unit initially being so oriented relative to the casing that the cover slide is aligned with the exposure window to prevent light entering the window from reaching the film disk, said camera comprising:

a. a housing structure including positioning means for locating a film cartridge assembly received by said camera in a predetermined operative position;

b. film unit assembly rotating means engageable with the hub member for initially removing the cover slide from closing alignment with the exposure window and for subsequently returning the cover slide into closing alignment with the exposure window;

c. adjustable means movable to a first position for preventing removal of a film cartridge assembly from the predetermined operative position and a second position for permitting removal of a film cartridge assembly from the predetermined operative position; and d. coordinating means operatively associated with said film unit assembly rotating means and with said adjustable means for moving said adjustable means to said second position in response to the return of the cover slide into closing alignment with the exposure window by said film unit assembly rotating means.

7. The invention defined by claim 6 including: interlock means operatively associated with said adjustable means for disabling said film unit assembly rotating means in response to said adjustable means being adjusted to said second position.

8. The invention defined by claim 6 wherein: said film unit assembly rotating means is adapted to rotate a hub member of a film cartridge assembly received by said camera in a first rotational direction to remove the cover slide from closing relation to the exposure window and to align successive exposure areas of the film disk with the window and subsequently to rotate the hub member in the opposite rotational direction to return the cover slide into closing alignment with the exposure window.

9. A camera adapted to receive a film cartridge assembly that includes a generally flat casing provided with an exposure window, a film unit including a rotatable film disk having a plurality of exposure areas, the film disk being enclosed within the casing and provided with a central hub member that is accessible from the exterior of the casing, the hub member including a plurality of circumferentially spaced index surfaces, each one of such index surfaces bearing the same predetermined spatial relation to its corresponding exposure area as each of the other of such index surfaces bears to its corresponding exposure area, said camera comprising:

a. a driving member engageable with the hub member of a film cartridge assembly received by said camera for imparting rotational movement to the film unit; and b. an index member engageable with successive ones of the index surfaces of the received film cartridge assembly to locate the film unit at successive index positions at which corresponding exposure areas of the film disk are aligned with the exposure window.

10. The invention defined by claim 9 including: pivot means pivotally supporting said index member for movement into and out of an indexing position in which said index member is engageable with one of the index surfaces of the film cartridge assembly received by said camera to locate the film unit of that film cartridge assembly at its corresponding index position.

11. The invention defined by claim 10 including: index member adjusting means connected with said driving member for pivotally moving said index member in synchronism with the rotational movement of the hub member of a film cartridge assembly received by said camera.

12. The invention defined by claim 10 including:

a. hub support means engageable with the hub member of a film cartridge assembly received by said camera for defining the rotational axis of that hub member;

b. optical means for exposing an exposure area of the film unit assembly so engaged with said hub support means;

c. a mechanism plate supporting said optical means, said hub support means, and said pivot means; and d. adjustment means for adjusting said pivot means relative to said mechanism plate in a direction generally tangential to the rotational path of the index surfaces of a film cartridge assembly received by said camera.

13. A camera adapted to use a film cartridge assembly, said film cartridge assembly including a casing provided with an exposure window and a film unit including a film disk attached to a hub member, the film disk being enclosed within the casing and the hub member being accessible from the exterior of the casing for imparting rotational movement to the film unit, said camera comprising:

a. a housing structure including positioning means for receiving and locating a film cartridge assembly in an operative position, b. film advancing means engageable with the hub of a film cartridge assembly received by said camera and operable for imparting rotation to the film unit of the film cartridge assembly;

c. spring means tensionable to store energy for operating said film advancing means to impart rotation to the film unit of the film cartridge assembly;

d. spring tensioning means for stressing said spring means to a predetermined tensioned condition;

e. retaining means adjustable to first condition for preventing removal of the film cartridge assembly from its operative position with respect to said camera and to a second condition for permitting removal of the film cartridge assembly from its operative position; and f. interlock means for preventing adjustment of said retaining means to said second condition when said spring means is in other than said predetermined tensioned condition.

14. A camera adapted to use a film cartridge assembly, the film cartridge assembly including a casing provided with an exposure window and a film unit including a film disk, a cover slide and a hub member, both the film disk and the cover slide being enclosed within the casing and carried by the hub member, the hub member being accessible from the exterior of the casing for imparting rotational movement to the film unit, the cover slide being adapted to close the exposure window when the film unit is in a predetermined rotational position relative to the casing, said camera comprising:
 a. a housing structure including positioning means for receiving and locating a film cartridge assembly in an operative position,
 b. a rotatable film drive member adapted to be rotatably coupled with the hub member of a film cartridge assembly received by said camera;
 c. spring means rotatively biasing said film drive member in a first rotational direction in which said film drive member urges the film unit to rotate in a predetermined film advancing direction;
 d. a manually operable member operatively connected with said film drive member and movable from a first position to a second position for rotating said film drive member in a second rotational direction in opposition to said spring means to thereby tension said spring means and to rotate the film unit simultaneously in a film returning direction to its predetermined rotational position relative to the casing.

15. The invention defined by claim 14 including:
 a. retaining means adjustable to first condition for preventing removal of the film cartridge assembly from its operative position with respect to said camera and to a second condition for permitting removal of the film cartridge assembly from its operative position; and
 b. releasing means for adjusting said retaining means to said second condition in response to movement of said manuall operable member to said second position.

16. A camera adapted to receive a film cartridge assembly, said film cartridge assembly including a casing provided with an exposure window and a rotatable film unit including a film disk enclosed with said casing and a hub member accessible from the exterior of said casing for imparting rotational movement to the film unit assembly, said film unit also including means defining a plurality of exposure areas on said film disk and a corresponding plurality of circumferentially spaced index surfaces, each one of such index surfaces bearing the same predetermined spatial relation to its corresponding exposure area as each of the other of such index surfaces bears to its corresponding exposure area, said camera comprising:
 (a) a driving member engageable with the hub member of a film cartridge assembly received by said camera for imparting rotational movement to the film unit during successive film advancing cycles;
 (b) an index member engageable with successive ones of the index surfaces of the received film cartridge assembly to locate the film unit at successive index positions at which corresponding exposure areas of the film disk are aligned with the exposure window; and
 (c) driving member actuating means including an advancing member and resilient means connecting the advancing member to the driving member whereby movement of the advancing member is transmitted to the driving member through the resilient means, said advancing member being movable at the completion of each successive film advancing cycle to a biasing position at which said resilient means is stressed to cause said driving member to impart rotational force resiliently to said hub member to thereby maintain the index surface of the film unit corresponding to the exposure are aligned with the exposure window in resilient engagement with said index member.

17. A camera including film exposure means, said camera being adapted to receive a film cartridge assembly, said film cartridge assembly including a casing provided with an exposure window and a rotatable film unit including a film disk enclosed within said casing and a hub member accessible from the exterior of said casing for imparting rotational movement to the film unit assembly, said film unit also including means defining a plurality of exposure areas on said film disk and a corresponding plurality of circumferentially spaced index surfaces, each one of such index surfaces bearing the same predetermined spatial relation to its corresponding exposure area as each of the other of such index surfaces bears to its corresponding exposure area, said camera comprising:
 (a) a driving member engageable with the hub member of a film cartridge assembly received by said camera for imparting rotational movement to the film unit during successive film advancing cycles;
 (b) an index member engageable with successive ones of the index surfaces of the received film cartridge assembly to locate the film unit at successive index positions at which corresponding exposure areas of the film disk are aligned with the exposure window; and
 (c) resilient means for resiliently imparting a force to said driving member to thereby rotationally bias the film unit for maintaining the index surface that corresponds to the exposure area aligned with the exposure window in resilient engagement with said index member during exposure of that exposure area.

18. A camera adapted to receive a film cartridge assembly, said film cartridge assembly including a casing provided with an exposure window and a rotatable film unit including a film disk enclosed within said casing and a hub member accessible from the exterior of said casing for imparting rotational movement to the film unit assembly, said film unit also including means defining a plurality of exposure areas on said film disk and a corresponding plurality of circumferentially spaced index surfaces, each one of such index surfaces bearing the same predetermined spatial relation to its corresponding exposure area as each of the other of such index surfaces bears to its corresponding exposure area, said camera comprising:
 (a) a driving member engageable with the hub member of a film cartridge assembly received by said camera for imparting rotational movement to the film unit during successive film advancing cycles;
 (b) an index member engageable with successive ones of the index surfaces of the received film cartridge assembly to locate the film unit at successive index positions at which corresponding exposure areas of the film disk are aligned with the exposure window;

(c) shutter means operable for exposing the film unit exposure area aligned with the exposure window of the received film cartridge assembly;

(d) resilient means for resiliently imparting a force to said driving member to thereby rotationally bias the film unit for maintaining the index surface that corresponds to the exposure area aligned with the exposure window in resilient engagement with said index member; and (e) interlocking means operatively connecting said shutter means with said resilient means to prevent operation of said shutter means except while said index member is resiliently engaged by the corresponding index surface under the influence of said resilient means.

* * * * *

Disclaimer 4,202,614.—*Donald M. Harvey*, Webster, N.Y. PHOTOGRAPHIC CAMERAS. Patent dated May 13, 1980. Disclaimer filed Feb. 9, 1981, by the assignee, *Eastman Kodak Co.*

Hereby enters this disclaimer to claims 1 through 3 of said patent.
[*Official Gazette May 12, 1981.*]